US011836950B2

(12) United States Patent
Atchison et al.

(10) Patent No.: US 11,836,950 B2
(45) Date of Patent: *Dec. 5, 2023

(54) QUALITY METRICS FOR AUTOMATIC EVALUATION OF DUAL ISH IMAGES

(71) Applicant: Ventana Medical Systems, Inc., Tucson, AZ (US)

(72) Inventors: Jeffrey Atchison, Campbell, CA (US); Jim Martin, Mountain View, CA (US); Anindya Sarkar, Milpitas, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 195 days.

This patent is subject to a terminal disclaimer.

(21) Appl. No.: 17/181,700

(22) Filed: Feb. 22, 2021

(65) Prior Publication Data
US 2021/0201536 A1      Jul. 1, 2021

Related U.S. Application Data

(63) Continuation of application No. 16/226,692, filed on Dec. 20, 2018, now Pat. No. 10,964,063, which is a
(Continued)

(51) Int. Cl.
*G06K 9/00*        (2022.01)
*G06T 7/90*        (2017.01)
(Continued)

(52) U.S. Cl.
CPC ............. *G06T 7/90* (2017.01); *G06T 5/003* (2013.01); *G06T 5/50* (2013.01); *G06T 7/0002* (2013.01);
(Continued)

(58) Field of Classification Search
CPC . G06T 2207/10056; G06T 2207/10061; G06T 2207/30024; G06T 2207/10028;
(Continued)

(56) References Cited

U.S. PATENT DOCUMENTS

2010/0266214 A1* 10/2010 Jobson ............... G06T 5/003
382/274
2012/0236120 A1* 9/2012 Kramer ........... G02B 21/0004
382/128
(Continued)

FOREIGN PATENT DOCUMENTS

WO   WO-2015007697 A1 *   1/2015   ........... G02B 21/006

*Primary Examiner* — Atiba O Fitzpatrick
(74) *Attorney, Agent, or Firm* — Charney IP Law, LLC; Thomas M. Finetti

(57) ABSTRACT

The present disclosure is directed to a computer system designed to (i) receive a series of images as input; (ii) compute a number of metrics derived from focus features and color separation features within the images; and (iii) evaluate the metrics to return (a) an identification of the most suitable z-layer in a z-stack, given a series of z-layer images in a z-stack; and/or (b) an identification of those image tiles that are more suitable for cellular based scoring by a medical professional, given a series of image tiles from an area of interest of a whole slide scan.

14 Claims, 12 Drawing Sheets

Related U.S. Application Data continuation of application No. 15/659,652, filed on Jul. 26, 2017, now Pat. No. 10,181,180, which is a continuation of application No. PCT/EP2016/051903, filed on Jan. 29, 2016.

(60) Provisional application No. 62/110,215, filed on Jan. 30, 2015.

(51) Int. Cl.
  *G06T 5/50* (2006.01)
  *G06T 7/00* (2017.01)
  *G06T 5/00* (2006.01)
  *G02B 21/36* (2006.01)

(52) U.S. Cl.
  CPC .......... *G06T 7/0014* (2013.01); *G02B 21/367* (2013.01); *G06T 2207/10024* (2013.01); *G06T 2207/10056* (2013.01); *G06T 2207/10148* (2013.01); *G06T 2207/20076* (2013.01); *G06T 2207/30024* (2013.01); *G06T 2207/30168* (2013.01)

(58) Field of Classification Search
  CPC . G06T 2207/10148; G06T 7/50; G06T 7/529; G06T 7/564; G06T 7/571; G06T 5/003–004; G06T 7/13; G06T 7/90; G06T 7/0014; G06T 2207/30168; G06V 20/69–698; G06V 2201/04; G01N 15/1468; G01N 15/1475; G01N 2015/1006; G01N 2015/1472; G02B 21/367; H04N 13/395
  See application file for complete search history.

(56) References Cited

U.S. PATENT DOCUMENTS

| | | | |
|---|---|---|---|
| 2013/0016885 A1* | 1/2013 | Tsujimoto | G06T 5/50 382/128 |
| 2014/0293117 A1* | 10/2014 | Murakami | H04N 5/2356 348/349 |
| 2015/0242676 A1* | 8/2015 | Barlaud | G06V 10/44 382/133 |
| 2015/0324997 A1* | 11/2015 | Murakami | G02B 21/365 348/207.1 |
| 2016/0051215 A1* | 2/2016 | Chen | G06V 10/42 715/771 |
| 2017/0116715 A1* | 4/2017 | Takayama | G02B 21/367 |
| 2020/0345320 A1* | 11/2020 | Chen | A61B 6/025 |

* cited by examiner

QUALITY METRICS FOR AUTOMATIC EVALUATION OF DUAL ISH IMAGES

CROSS-REFERENCE TO RELATED APPLICATIONS

This patent application is a continuation U.S. patent application Ser. No. 16/226,692 filed on Dec. 20, 2018, which application is a continuation U.S. patent application Ser. No. 15/659,652, filed on Jul. 26, 2018, which is a continuation of International Patent Application No. PCT/EP2016/051903 filed on Jan. 29, 2016, which claims priority to and the benefit of U.S. Provisional Application No. 62/110,215 filed on Jan. 30, 2015. Each of the above patent applications are hereby incorporated by reference herein in their entireties.

BACKGROUND OF THE DISCLOSURE

Molecular pathology is the examination at a molecular level of the DNA, mRNA, and proteins that cause or are otherwise associated with disease. Gene amplification and/or overexpression have been identified as an indicator of patient prognosis in a variety of tumors or for determining those patients that should be provided certain treatments. For example, a certain type of breast cancer is associated with an over-abundance (e.g., over expression) of the human epidermal growth factor 2 ("HER2") versus the number of chromosome 17s found in the cell. Sadly, this alteration is also an independent prognostic factor predictive of poor clinical outcome and a high risk of recurrence. By detecting the number of HER2 genes versus the number of chromosome 17s in a tissue sample, this particular type of breast cancer can be more readily identified and treatment options can be evaluated.

In-situ hybridization can be used to look for the presence of a genetic abnormality or condition such as amplification of cancer causing genes specifically in cells that, when viewed under a microscope, morphologically appear to be malignant. In situ hybridization (ISH) employs labeled DNA or RNA probe molecules that are anti-sense to a target gene sequence or transcript to detect or localize targeted nucleic acid target genes within a cell or tissue sample. ISH is performed by exposing a cell or tissue sample immobilized on a glass slide to a labeled nucleic acid probe which is capable of specifically hybridizing to a given target gene in the cell or tissue sample. Several target genes can be simultaneously analyzed by exposing a cell or tissue sample to a plurality of nucleic acid probes that have been labeled with a plurality of different nucleic acid tags. By utilizing labels having different emission wavelengths, simultaneous multicolored analysis may be performed in a single step on a single target cell or tissue sample. For example, INFORM HER2 Dual ISH DNA Probe Cocktail Assay from Ventana Medical Systems, Inc., is intended to determine HER2 gene status by enumeration of the ratio of the HER2 gene to Chromosome 17. The HER2 and Chromosome 17 probes are detected using a two color chromogenic ISH in formalin-fixed, paraffin-embedded human breast cancer tissue specimens.

Digital microscopy systems have been introduced wherein tissue samples are prepared in a traditional manner, i.e. mounted on glass slides, but instead of having the pathologist view the samples using a manually controlled optical microscope, the slides are processed using digital imaging equipment. In recent years, digital pathology has transformed from the use of camera-equipped microscopes to high-throughput digital scanning of whole tissue samples. This development not only enables virtual storing and sharing of biological data, but it also improves the turn-around times for the pathologist and the patient.

The dramatic increase of computer power over the past decades, together with the development of advanced image analysis algorithms, has allowed the development of computer-assisted approaches capable of analyzing the biomedical data and assisting in the diagnosis. Interpreting tissue slides manually is labor intensive, costly and involves the risk of human errors and inconsistency, while using automated image analysis can provide additional automatic, fast and reproducible analyses, assisting the pathologist in making an accurate and timely diagnosis.

Challenges remain in computer-assisted diagnosis, including increasing the accuracy and speed in providing a useful outcome, and at the same time handling the enormous amount of data involved in digital histological samples. Thus, while advancements have been made, there remains the need to further improve upon image acquisition and to balance image quality with speed in image acquisition. Indeed, properly focused images having sharp, discernible features are needed for further downstream processing, and failure to provide quality, focused images could lead to errors or ambiguous results. To date, however, only generic algorithms have been developed to determine image focus. For example, previous approaches have derived sharpness metrics based solely on a green channel of a color image. These generic approaches are not, however, able to consistently capture an image that provides both good focus and clear discrimination between differently colored features of an image, both indispensable qualities for images undergoing cellular based scoring. It would be desirable to have a new focus metric to help select the most suitable focus depth of a region of a tissue sample for further scanning and downstream processing. It is to be noted that for Dual ISH, since the gene expression is manifested through dots, the scanning needs is performed at 40× resolution, while for most digital pathology applications, a resolution of 20× is sufficient. Since a scanning resolution of 40× resolution is necessary for Dual ISH, an improved focus metric which ensures better quality at the 40× resolution is required for Dual ISH.

In addition, automatic quality evaluation of a whole slide scan has been another challenging problem, and there are no known state-of-the-art methods which can automatically detect "better quality" and "easy-to-score" regions, especially for Dual ISH scans. Thus, it would also be desirable to have an automated and computationally efficient way to assist a medical professional in assessing the quality of digital images of tissue samples, wherein the assessment accommodates different features appearing in the whole slide scanned image.

BRIEF SUMMARY OF THE DISCLOSURE

In one aspect of the present invention is a computer device configured to analyze images from tissue samples comprising one or more processors and at least one memory, the at least one memory storing non-transitory computer-readable instructions for execution by the one or more processors to cause the one or more processors to execute instructions to (i) compute a number of metrics derived from focus features and color separation features within the images of the tissue samples; and (ii) evaluate the metrics to return (a) an identification of the "most suitable" z-layer in a z-stack (as defined herein), given a series of z-layer images in a z-stack;

and/or (b) an identification of those image tiles that are "more suitable" (as defined herein) for cellular based scoring by a medical professional, given a series of image tiles from an area of interest of a whole slide scan.

In some embodiments, the tissue sample is pretreated with two in situ hybridization probes so as to provide samples, namely cells having differently colored dots, e.g. black and red, signifying marked genes. In some embodiments, the metrics are derived by evaluating features of black dots and red dots present in the cells in each of the images. In some embodiments, the metrics are computed by applying one or more filters to the images received as inputs, where the filters adapt the images such that focus and/or color separation features may be derived. Without wishing to be bound by any particular theory, it is believed that any z-layer identified as the best layer comprises dots having good focus and clear discrimination between differently colored dots (e.g. black vs. red dots have high color separation). In addition, it is believed that image tiles identified as "more suitable" for scoring also comprise dots having good focus and clear discrimination between differently colored dots (e.g. black vs. red dots).

In another aspect of the present disclosure is a computer system for determining the most suitable z-layer in a given z-stack, comprising one or more processors and at least one memory, the at least one memory storing non-transitory computer-readable instructions for execution by the one or more processors to cause the one or more processors to: compute focus metrics and color separation metrics for each z-layer within a z-stack of images, each z-layer within the z-stack corresponding to an image of a tissue sample; and evaluate the focus metrics and color separation metrics to determine a most suitable z-layer within the z-stack. In some embodiments, the focus metrics comprise a focus quality score for each z-layer, and wherein the color separation metrics comprise a color separation quality score for each z-layer. In some embodiments, the focus quality score for each z-layer and the color separation quality score for each z-layer are independently computed within color spaces that are empirically determined to provide the best focus and/or color separation for a particular in situ hybridization assay.

In some embodiments, the evaluation of the focus metrics and color separation metrics comprises computing an absolute value metric and determining whether the absolute value metric is greater than, equal to, or less than a predetermined threshold value. In some embodiments, the absolute value metric is an absolute value of the difference between the z-layer having best focus and the z-layer having best color separation. In some embodiments, the z-layer having best focus and the z-layer having best color separation are each independently computed by median filtering the focus quality scores and color separation quality scores, respectively, and then identifying a maximum value for the median filtered focus quality scores and a maximum value for the median filtered color separation quality scores. In some embodiments, if the absolute metric is determined to be less than or equal to the predetermined threshold value, instructions are provided to set the most suitable z-layer as a compromise layer metric, wherein the compromise layer metric is an average value of the z-layer having best focus and the z-layer having best color separation. In some embodiments, if the absolute metric is determined to be greater than the predetermined threshold value, instructions are provided to evaluate whether the most suitable z-layer should be guided by focus features or color separation features. In some embodiments, the evaluation of whether the most suitable z-layer should be guided by focus features or color separation features is determined by comparing a layer focus comparator value to a layer color separation comparator value, whereby if the layer focus comparator value is greater than the layer color separation comparator value, the most suitable z-layer is set as the z-layer having best focus, and whereby if the layer focus comparator value is less than the layer color separation value, the most suitable z-layer is set as the z-layer having best color separation.

In another aspect of the present disclosure is a computer-implemented method for determining the most suitable z-layer in a given z-stack, comprising computing focus metrics and color separation metrics for each z-layer within a z-stack of images, each z-layer within the z-stack of images corresponding to an image of a tissue sample, and evaluating the focus metrics and color separation metrics to determine a most suitable z-layer within the z-stack. In some embodiments, the focus metrics comprise a focus quality score for each z-layer, and wherein the color separation metrics comprise a color separation quality score for each z-layer.

In some embodiments, the of the focus metrics and color separation metrics comprises computing an absolute value metric and determining whether the absolute value metric is greater than, equal to, or less than a predetermined threshold value. In some embodiments, the absolute value metric is an absolute value of the difference between the z-layer having best focus and the z-layer having best color separation. In some embodiments, the z-layer having best focus and the z-layer having best color separation are each independently computed by median filtering the focus quality scores and color separation quality scores, respectively, and then identifying a maximum value for the median filtered focus quality scores and a maximum value for the median filtered color separation quality scores. In some embodiments, if the absolute metric is determined to be less than or equal to the predetermined threshold value, instructions are provided to set the most suitable z-layer as a compromise layer metric, wherein the compromise layer metric is an average value of the z-layer having best focus and the z-layer having best color separation. In some embodiments, if the absolute metric is determined to be greater than the predetermined threshold value, instructions are provided to evaluate whether the most suitable z-layer should be guided by focus features or color separation features. In some embodiments, the evaluation of whether the most suitable z-layer should be guided by focus features or color separation features is determined by comparing a layer focus comparator value to a layer color separation comparator value, whereby if the layer focus comparator value is greater than the layer color separation value, the most suitable z-layer is set as the z-layer having best focus, and whereby if the layer focus comparator value is less than the layer color separation value, the most suitable z-layer is set as the z-layer having best color separation.

In another aspect of the present disclosure is a computer-implemented method for the automated evaluation of image tiles derived from a whole slide scan comprising: (a) computing a plurality of focus features and a plurality of color separation features for each individual image tile; (b) deriving a focus quality score from the plurality of focus features and a color separation quality score from the plurality of color separation features; and (c) identifying digital image tiles more suitable for downstream processing based on the focus quality score and the color separation quality score. In some embodiments, the plurality of focus features are selected from (i) a mean/median of the 0th DoG layer for all dot pixels in the image tile; (ii) a mean/median of the 0th DoG layer for all black dot pixels in the image tile; (iii) a mean/median of the max DoG values of the 0th layer for all dot blobs in the image tile; and (iv) a mean of the top DoG values for the 0th layer for all dot blobs in the image tile.

In some embodiments, the plurality of color separation features are selected from (i) Amax, (ii) Asigmax; (iii) a maximum in an unmixed black channel; (iv) a gradient value for at least one channel selected from the group consisting of a luminance channel, an unmixed red channel, an A channel, an Asig channel, and a green channel; (v) DoG values in at least one of a channel selected from the group consisting of a green channel, an A channel, and an optical density domain absorbance channel; and (vi) color domain features based on modeling color information in terms of ellipses.

In some embodiments, the method further comprises generating a heat map. In some embodiments, the method further comprises generating an overlay, where the overlay indicates digital image tiles more suitable for downstream processing. In some embodiments, the focus quality score and color separation quality score are computed only for those tiles having at least one dot corresponding to a first in situ hybridization signal and at least one dot corresponding to a second in situ hybridization signal (e.g. a red signal and a black signal).

In another aspect of the present disclosure is a computer system for the automated evaluation of image tiles derived from a whole slide scan comprising one or more processors and at least one memory, the at least one memory storing non-transitory computer-readable instructions for execution by the one or more processors to cause the one or more processors to: (a) compute a plurality of focus features and a plurality of color separation features for each individual image tile; (b) derive a focus quality score from the plurality of focus features and a color separation quality score from the plurality of color separation features; and (c) identify digital image tiles more suitable for downstream processing based on the focus quality score and the color separation quality score. In some embodiments, the plurality of focus features are selected from (i) a mean/median of the 0th DoG layer for all dot pixels in the image tile; (ii) a mean/median of the 0th DoG layer for all black dot pixels in the image tile; (iii) a mean/median of the max DoG values of the 0th layer for all dot blobs in the image tile; and (iv) a mean of the top DoG values for the 0th layer for all dot blobs in the image tile.

In some embodiments, the plurality of color separation features are selected from (i) Amax, (ii) Asigmax; (iii) a maximum in an unmixed black channel; (iv) a gradient value for at least one channel selected from the group consisting of a luminance channel, an unmixed red channel, an A channel, an Asig channel, and a green channel; (v) DoG values in at least one of a channel selected from the group consisting of a green channel, an A channel, and an optical density domain absorbance channel; and (vi) color domain features based on modeling color information in terms of ellipses.

In some embodiments, instructions are provided to compute a heat map. In some embodiments, instructions are provided to generate an overlay, where the overlay indicates digital image tiles more suitable for downstream processing. In some embodiments, the focus quality scores and color separation quality score are computed only for those tiles having at least one dot corresponding to a first in situ hybridization signal and at least one dot corresponding to a second in situ hybridization signal.

In another aspect of the present disclosure is a computer device configured to analyze images from tissue samples comprising one or more processors and at least one memory, the at least one memory storing non-transitory computer-readable instructions for execution by the one or more processors to cause the one or more processors to (i) receive a series of images as input, each image corresponding to a z-layer in a z-stack; (ii) run a focus assessment module to compute a number of metrics derived from focus features and color separation features within the images; and (iii) output a most suitable z-layer in a z-stack of images based on the computed metrics. In some embodiments, a quality assessment module is run and an identification of tiles within the input image that are more suitable for downstream processing are provided as outputs.

In another aspect of the present disclosure is a computer system for determining a z-layer that, compared to other z-layers in a given z-stack, comprise features that are well focused and have clearly discernible color features such that differently colored features may be recognized from each other, comprising one or more processors and at least one memory, the at least one memory storing non-transitory computer-readable instructions for execution by the one or more processors to cause the one or more processors to execute instructions to: retrieve a series of images from a z-stack of images, each image corresponding to a different z-layer in the z-stack, and wherein the images are captured from a portion of a tissue specimen pre-treated with two in situ hybridization probes; compute focus metrics and color separation metrics for each z-layer in the z-stack, wherein the focus metrics are derived from focus features of stained regions within the images and wherein the color separation metrics are derived from color separation features of stained regions within the images; and determine the z-layer that, compared to other z-layers in the given z-stack comprises features that are well focused and have clearly discernible color features, based on evaluation of the focus metrics and color separation metrics.

In another aspect of the present disclosure is a computer device or system for determining the most suitable z-layer in a given z-stack comprising one or more processors and at least one memory, the at least one memory storing non-transitory computer-readable instructions for execution by the one or more processors to cause the one or more processors to execute instructions to: retrieve a series of images from a z-stack of images, each image corresponding to a different z-layer in the z-stack, wherein the images are derived from a portion of a tissue specimen pre-treated with two in situ hybridization probes; compute focus metrics and color separation metrics for each z-layer in the z-stack, wherein the focus metrics are derived from focus features within the images and wherein the color separation metrics are derived from color separation features within the images; determine a most suitable z-layer within the z-stack based on the evaluation of the focus metrics and color separation metrics; and output the most suitable z-layer for further use in further downstream processes.

In some embodiments, the focus metrics comprise a focus quality score for each z-layer in the given z-stack and the color separation metrics comprise a color separation quality score for each z-layer in the same z-stack. In some embodiments, the focus metrics further comprise an identification of a z-layer having the best focus as compared with other z-layers in the z-stack; and the color separation metrics further comprise an identification of a z-layer having the best color separation as compared with other z-layers in the z-stack. In some embodiments, the system further comprises instructions to compute the z-layer having best focus and the z-layer having best color separation by applying an algorithm to independently median filter the focus and color separation quality scores, respectively, and then identify a maximum value for the median filtered focus quality scores and separately identify a maximum value for the median filtered color separation quality scores. In some embodiments, the system further comprises instructions to choose a compromise layer, wherein the compromise layer chosen is an average value of the z-layer having best focus and the z-layer having best color separation; and instructions to compute an absolute value metric, wherein the absolute value metric is an absolute value of the difference between a value of the z-layer having best focus and a value of the z-layer having best color separation.

In another aspect of the present disclosure is a computer system for determining the most suitable z-layer in a given z-stack comprising a memory for storing a sequence of program instructions and/or images; a processor communicatively coupled with the memory that is configured to execute the program instructions; wherein the program instructions retrieve input images corresponding to a series of z-layers in a given z-stack of images; compute a focus score and a color separation score for each layer in a z-stack; determine a z-layer having best focus based on the focus scores of all of the z-layers in the z-stack; determine a z-layer having best color separation based on the color separation scores of all of the z-layers in the z-stack; determine whether the absolute value of a difference between the z-layer having best focus and the z-layer having best color separation is greater than, equal to, or less than a pre-defined threshold; where if the absolute difference is greater than the threshold, the most suitable z-layer for further processing is computed based on whether focus features or color separation features provide a better indication of image scoreability (i.e. whether the best focused layer is easiest to score, or the layer with the best color separation is easiest to score); and if the absolute value difference is less than or equal to the threshold, compute the best z-layer based on a combination of focus features and color separation features; and outputting the most suitable z-layer for further processing. In some embodiments, the focus scores and color separation scores are each computed based on an empirically determined color space based on features that best describe the focus and separately features that best describe color separation of the regions of interest in the images. In some embodiments, the focus metrics and color separation metrics are derived by evaluating features of black dots and red dots in the cells present in the images, wherein the images are derived from tissue samples pretreated with two different in situ hybridization probes (e.g. for Dual ISH). In some embodiments, the black dots and red dots are present in the images of cell nuclei whose originating tissue was treated with a dual color, dual hapten assay, such that the red dots represent detection of chromosome 17 while the black dots represent detection of the HER2 gene.

In another aspect of the present disclosure is a quality assessment module for a computer-based system for determining particular tiles of a whole slide scan which may be better suited for scoring by a pathologist comprising one or more processors and at least one memory, the at least one memory storing non-transitory computer-readable instructions for execution by the one or more processors to cause the one or more processors to execute instructions to (a) analyze the image tiles in order to compute a plurality of focus features and a plurality of color separation features; (b) determine a focus quality score for each image tile based on the focus features and a color separation quality score for each image tile based on the color separation features; (c) output an identification of those image tiles that may be more suitable for cellular based scoring by a medical professional. In some embodiments, instructions are provided to filter the respective quality scores to return a user specified percentage of image tiles having the highest quality for scoring by a pathologist. In some embodiments, the system provides instructions for the generation of an image overlay which is superimposed over at least a portion of the whole slide scan image and which visually reflects the image tiles that may be more suitable for scoring by a pathologist. The quality assessment module described herein may be run by a computer system contemporaneously while the system scans and/or captures images, including while computing metrics and performing evaluations to determine the most suitable z-layer. In some embodiments, the focus quality scores and color separation quality scores of the quality assessment module may be used to compute a most suitable z-layer in a z-stack, although on current computer systems, computation and evaluation in this manner is slower than the method described herein for z-layer identification. In some embodiments, the quality assessment module may be run on images scanned using the focus metric module described herein. In other embodiments, the quality assessment module may be run on images scanned using a prior art focus module.

In a further aspect, the disclosure relates to an image analysis method for determining one of a plurality of z-layers in a z-stack of digital images. The image of the determined z-layer is to be used for computing tissue-related or cell-related scores. The z-stack of digital images depicts different layers of a single tissue sample located on a slide. The z-stack images have been acquired by varying the focus of an optical sensor, e.g. by varying the focus of the optical sensor in steps and capturing a new image for each step. The method comprises:

for each of the z-layers, computing focus metrics, each focus metric being an indicator of focus quality of the z-layer and being derived from image data of said z-layer;

for each of the z-layers, computing color separation metrics, each color separation metric being an indicator of color separation quality of the z-layer and being derived from image data of said z-layer; and evaluating the focus metrics and the color separation metrics and determining the one of the z-layers to be used for computing tissue-related or cell-related scores in dependence on the focus metrics and color separation metrics for each of the z-layers.

Applicants have discovered a superior method of determining the most suitable z-layer in a given z-stack of images. Indeed, when compared to prior art methods, the present method for z-layer identification is consistently superior and experimentation has shown that the new method is able to accurately determine the most suitable z-layer in more cases as compared with the prior art methods. Moreover, the focus metric disclosed herein is able to return z-layers that consistently meet the requirements of good focus and high discriminability between the two different dot colors (red and black). Thus, the method disclosed herein provides for a fast focus metric that returns the most suitable z-layer in a significantly higher number of cases as compared to the prior art focusing methods.

BRIEF DESCRIPTION OF THE DRAWING FIGURES

FIG. 1 shows a computer-based system for analyzing specimens in accordance with an embodiment of the disclosed technology;

FIG. 2 provides a flowchart showing the steps of determining a most suitable z-layer in a z-stack of images (focus assessment module);

FIG. 3 provides a flowchart showing the steps of determining suitable tiles for further processing (quality assessment module);

Figure 6:
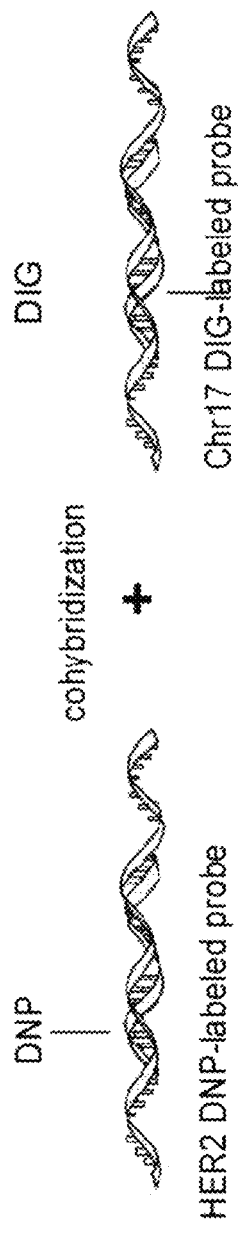
Figure 6:
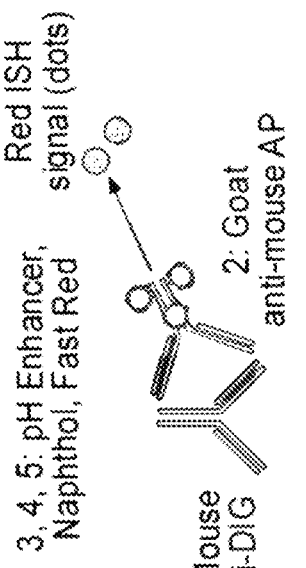
Figure 6:
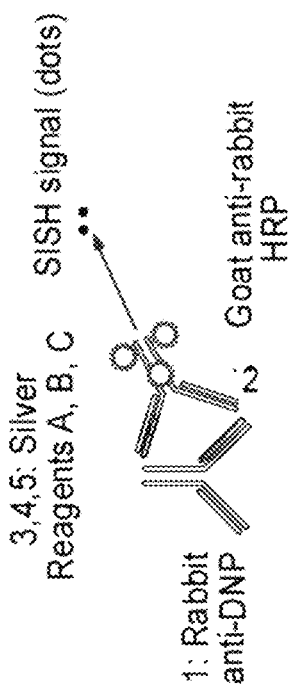
Figure 7A:
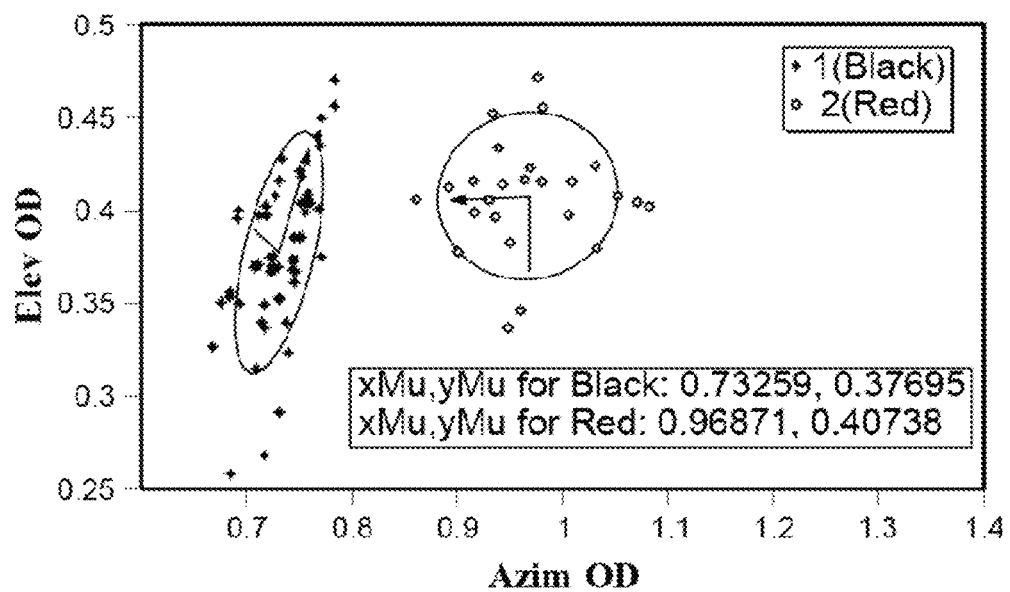
Figure 7B:
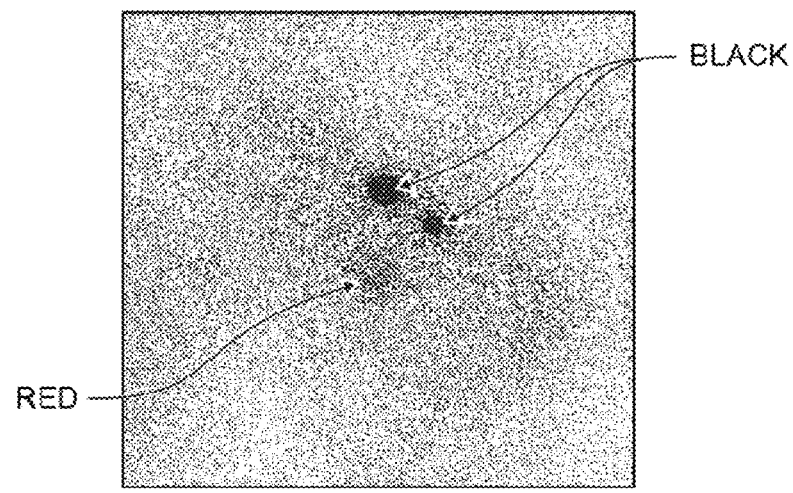
Figure 8:
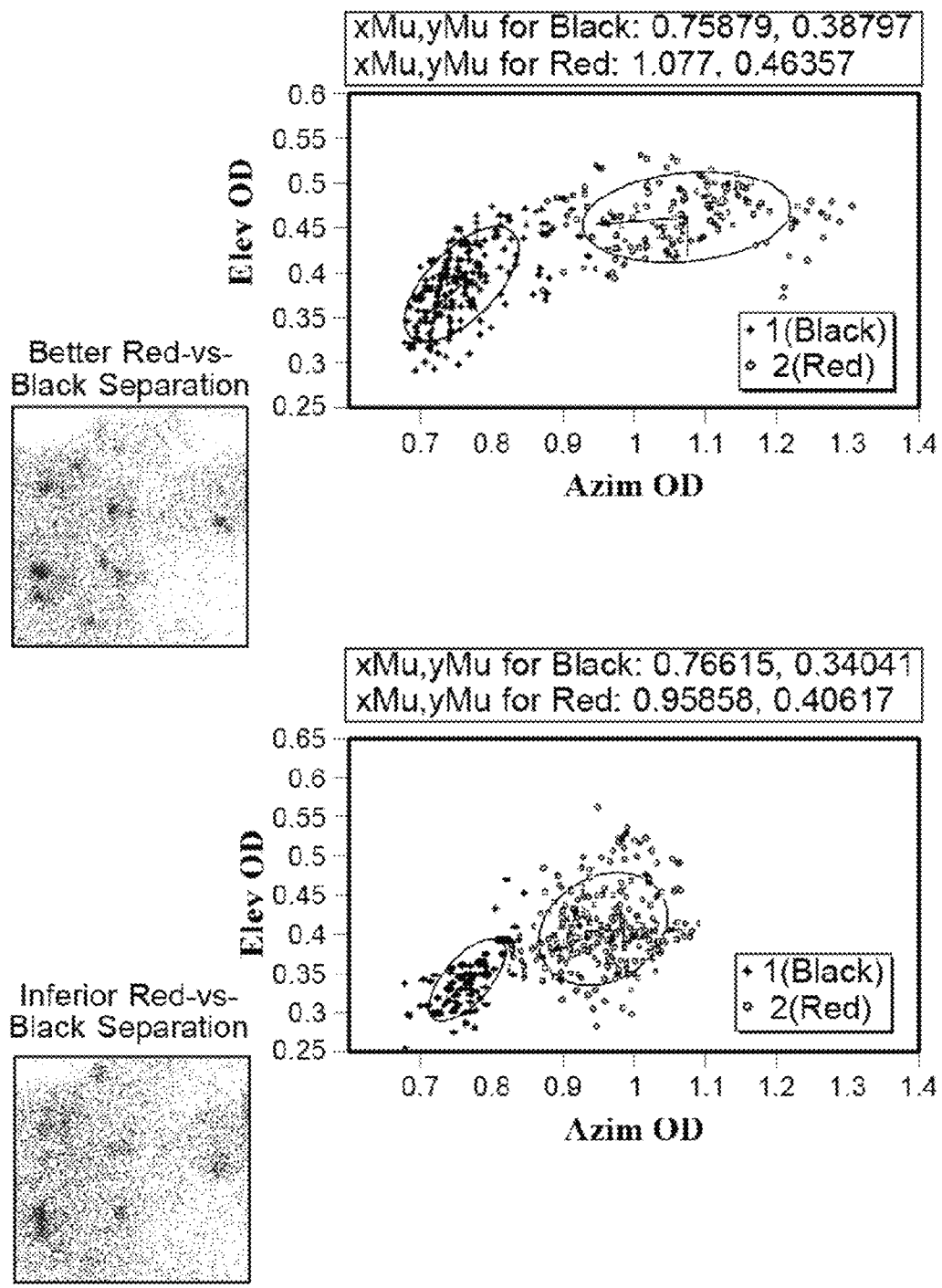

FIG. 6 provides an example of a dual ISH assay to detect HER2 having SISH signal dots and Red ISH signal dots;

FIG. 7A shows an example of ellipse fitting based on features indicating red versus black separation;

FIG. 7B provides a visual representation of red versus black color separation based on the ellipse fitting of FIG. 7A where the black and red dots are labeled; and FIG. 8 provides an example of how a change of z-layer can cause better red versus black separation, which can be measured by the ellipse fitting method.

Figure 9:
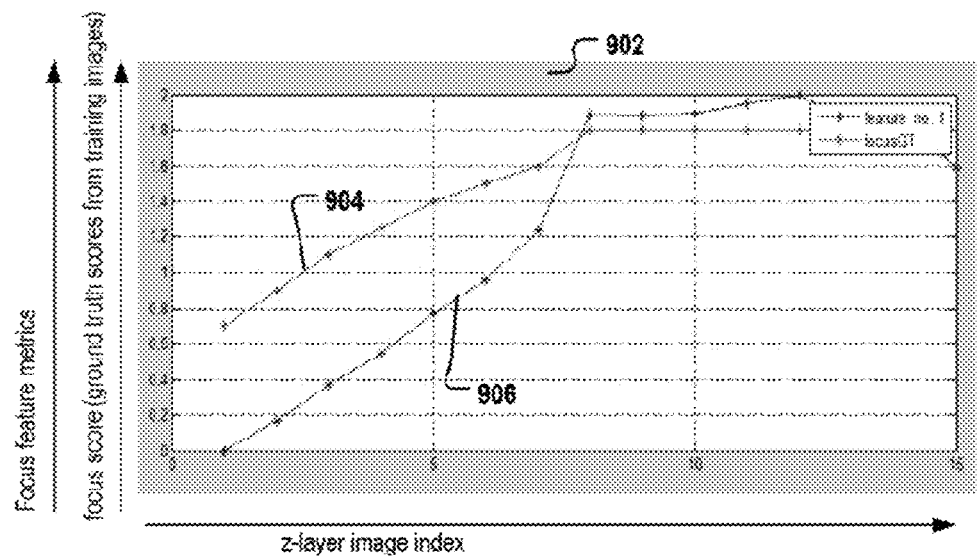

FIG. 9 depicts a plot that illustrates the predictive power for an example focus metric having a high predictive power in respect to identifying images having high focus quality.

Figure 10A:
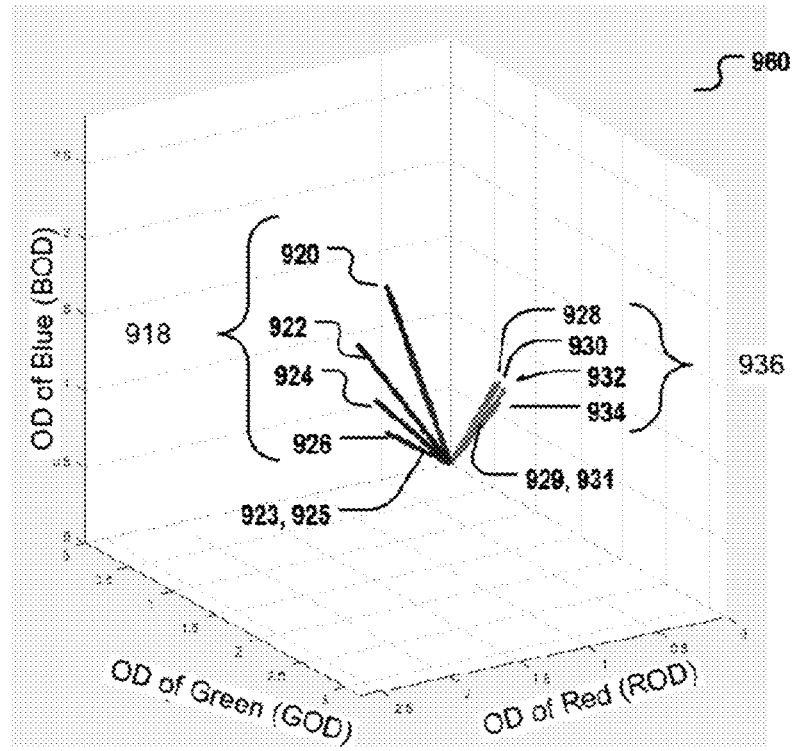

FIG. 10a depicts the representation of 6 dots of a first color and 6 dots of a second color in an optical density domain coordinate system.

Figure 10B:
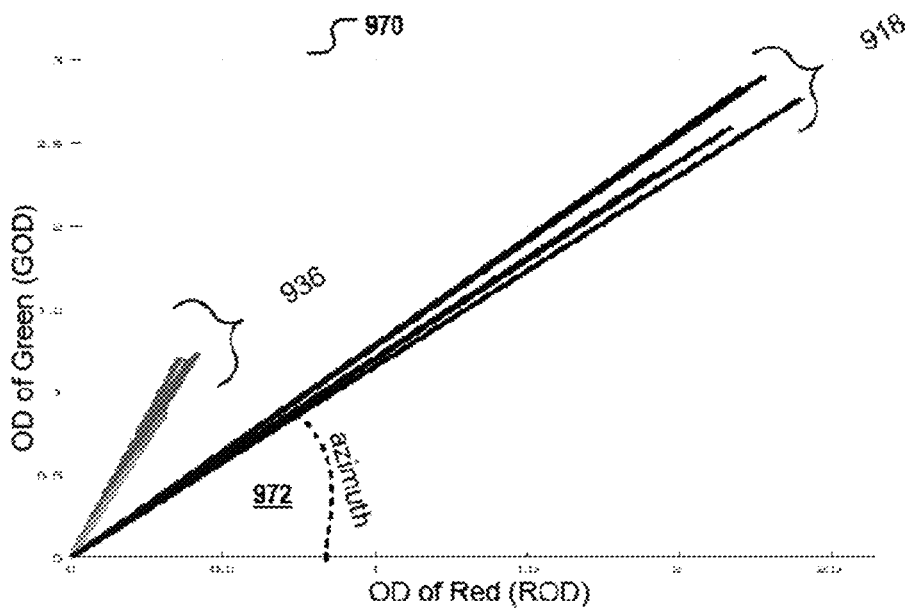
Figure 10C:
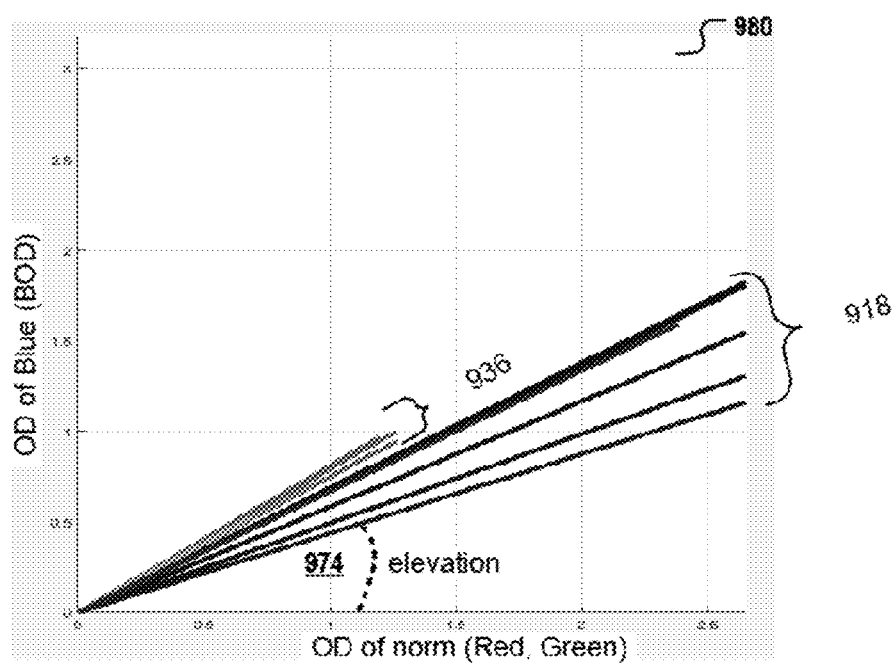

FIGS. 10b and 10c depict the projections for finding the azimuth and elevation angles for the vectors of FIG. 10a.

Figure 11:
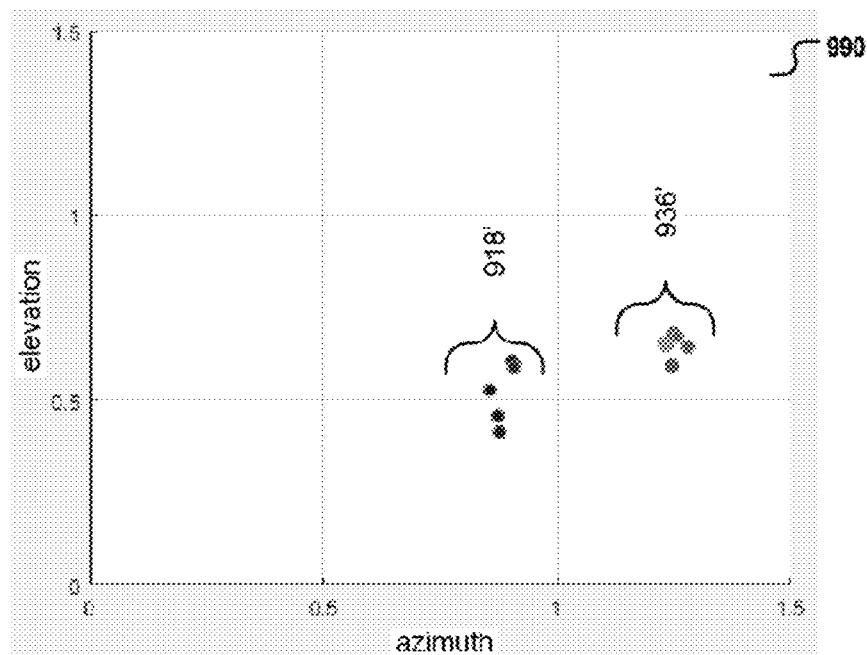

FIG. 11 depicts the representation of the 8 vectors of FIGS. 10b and 10c in an azimuth-elevation plot.

DETAILED DESCRIPTION

As used herein, the singular terms "a," "an," and "the" include plural referents unless the context clearly indicates otherwise. Similarly, the word "or" is intended to include "and" unless the context clearly indicates otherwise.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

A "tissue sample" as used herein is any biological sample that is obtained from a human or animal body for anatomic pathology. For example, a tissue sample may be derived from breast tissue, lung tissue, prostate tissue, etc. and may comprise samples derived from tumors, suspected tumors, or from healthy tissue. Other examples of tissue samples and specimens are their preparation are disclosed herein. The tissue sample may be treated in an assay with one or more stains to assist in the identification of structures (e.g. vessels, cells, etc.) within the sample.

An "unmixed image" as used herein encompasses a grey-value or scalar image obtained for one channel of a multi-channel image. By unmixing a multi-channel image one unmixed image per channel is obtained.

The present disclosure describes a focus algorithm ("focus metric module") which Applicants believe to be better capable of capturing the most suitable z-layer in a given z-stack of images. The present disclosure sets forth the goal of being to obtain image scans of tissue samples where image features are in good focus and where features of different colors (e.g. corresponding to first and second in situ hybridization signals) may be clearly discernible from each other, such that the red and black dots may be visually and algorithmically distinguishable.

The present disclosure also provides a "quality assessment" module which computes different metrics based on focus quality and allows for discrimination between differently colored image objects for a particular image tile and, given this information, provides guidance to a medical professional, e.g. in the form of a heat map, showing those tiles which are believed to be more suitable for further processing or analysis. Indeed, the quality assessment module provides an identification of recommended tiles regarded by the algorithm as having a "better quality" and the medical professional may concentrate on cell selection and scoring on those tiles/regions. The quality assessment module is intended to help and guide the pathologist or other medical professional in selecting easy-to-score regions in a whole slide scan (e.g. as required by dual ISH protocols).

The quality assessment module and separate focus metric module are independent modules. In some embodiments, the focus metric module runs inside the scanner during the real-time process of scanning while the "quality assessment" module runs on all the image tiles in an "offline" mode once the whole slide scan has been generated.

At least some embodiments of the technology disclosed herein relate to computer systems and methods for analyzing digital images from tissue samples pretreated with in situ hybridization probes. The samples may be a breast tissue sample processed according to an in situ hybridization ("ISH") protocol, as known in the art. In other embodiments, the specimen is a gastric tissue sample including, but not limited to stomach tissue, esophageal tissue, gastro-esophageal junction tissue, intestinal tissue, and colon tissue, again processed according to an ISH protocol. While specific examples herein may refer to breast tissue, these and other tissues are contemplated.

The ISH protocol provides visualization of specific nucleic acid sequences (e.g., DNA, mRNA, etc.) in frozen tissue sections, fixed/paraffin embedded tissue sections, or other cell preparations by hybridizing complementary strands of nucleotides (e.g., probes) to the sequence of interest. The ISH protocol can include, without limitation, a dual SISH and Red ISH protocol, single Red ISH protocol, single SISH protocol, or the like.

Although exemplary embodiments described herein disclose the application of a dual ISH probe to breast tissue, ultimately for the detection of the expression of the HER2 gene in the cells contained therein, it will be appreciated that the technology can be used to analyze images of other tissue samples treated with other probes and/or assays to detect other genes or portions thereof in cells, as well as other features of interest. Indeed, certain embodiments disclose application of dual ISH scans, taken at 40× resolution, where over- or under-expression of a gene depends on the identification of stained dots, where black dots and red dots are expressed through HER2 and Chr-17 markers, respectively. While the present disclosure pertains to identifying the most suitable layer in a z-stack and/or providing a quality analysis of image tiles, images captured of tissue samples are ultimately evaluated in further downstream processes, e.g. to determine a ratio of black dots to red dots for HER2 detection, as described further in Example 1 herein.

Although tissue samples on microscope slides appear flat (two-dimensional), they are three-dimensional objects having a considerable amount of variation in thickness. This is apparent when the slides are considered at microscopic levels where different images corresponding to different planes (z-axis) may be captured to create a (volume stack) z-stack of images. For example, for a 25-micron thick sample, it is possible to adjust the distance from a sample to an objective lens (z-axis) in about five micron increments to visualize and/or digitally capture five different images, with each image being in a different plane and having a different focus depth. Of course, the sample may be of any thickness and any incremental focus depth may be chosen (e.g. 1 micron, 0.5 micron, 0.25 micron, 2 micron spacings). It is believed that for the specific problem of better Dual ISH scanning, a slight difference in focus depth of about 0.25 microns (which is, e.g., the finest resolution for the Coreo and HT scanners for a z-scan) may lead to noticeable changes in image sharpness and focus, and hence the difference between consecutive z-layers for Dual ISH scanning is generally kept at the finest possible z-resolution of about 0.25 micron. In some embodiments, the number of planes digitally captured in any given z-stack ranges from about 10 to about 20. In some embodiments, the number of planes digitally captured is about 15.

As used herein, a set of images acquired from one location on the specimen at different focus depths is referred to as a "z-stack" and each individual image in a given z-stack is referred to as a "z-layer." Thus, each z-layer in a given z-stack represents an image having a different focal plane within a tissue sample location.

As used herein, the term "tile" refers to a region of a whole slide scan or an area of interest having an (x,y) pixel dimension (e.g. about 300× about 300 pixels). Tile size/area selection is described further herein.

Figure 1:
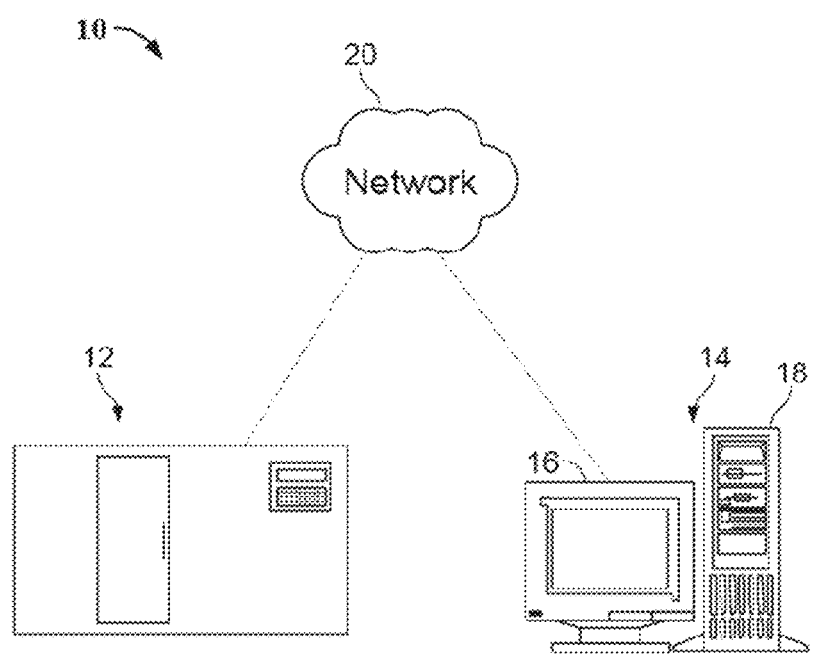

By way of example, a computer-based specimen analyzer for analyzing specimens is shown in FIG. 1. The skilled artisan will appreciate that other computer systems may be utilized and that the computer systems described herein may be communicatively coupled to additional components, e.g. analyzers, scanners, etc. Some of these additional components and the various computers that may be utilized are described further herein.

In general, the imaging apparatus 12 can include, without limitation, one or more image capture devices. Image capture devices can include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. A CCD sensor can capture a digital image of the specimen. One method of producing a digital image includes determining a scan area comprising a region of the microscope slide that includes at least a portion of the specimen. The scan area may be divided into a plurality of "snapshots." An image can be produced by combining the individual "snapshots." In some embodiments, the imaging apparatus 12 produces a high-resolution image of the entire specimen.

The computer system 14 can include a desktop computer, a laptop computer, a tablet, or the like and can include digital electronic circuitry, firmware, hardware, memory, a computer storage medium, a computer program, a processor (including a programmed processor), or the like. The illustrated computing system 14 of FIG. 1 is a desktop computer with a screen 16 and a tower 18. The tower 18 can store digital images in binary form. The images can also be divided into a matrix of pixels. The pixels can include a digital value of one or more bits, defined by the bit depth. The network 20 or a direct connection interconnects the imaging apparatus 12 and the computer system 14.

Focus Assessment Module

In a first aspect is an improvement to the overall scanning workflow for Dual ISH by computing focus scores which ensures that for Dual ISH z-stacks, the best layer (as defined further below) is more likely to be picked as compared with prior art methods. In this disclosure, we explain how focus score is computed (since scanning is a real time process, the focus metric computation needs to be relatively fast), what the intuition is behind the new focus score computation, and what experiments have been conducted to ensure that the new focus metric is better than old focus metrics.

Therefore, in one aspect of the present disclosure is a computer-based device or system for determining the most suitable z-layer in a z-stack for further processing, e.g. obtaining a high resolution scan of just the single z-layer in the given z-stack having features that are well focused and where differently colored features may be cleared discriminated from each other (i.e. good color separation, e.g. to clearly discriminate first ISH signals from second ISH signals or red dots from black dots). The steps for determining the most suitable z-layer are described herein.

As used herein, the term "color separation" means clear and discernible differentiation between the colors of features in an image. Color separation is represented graphically in FIG. 8 where an image having better color separation (top image) is compared to one having inferior color separation (bottom image), such that when the black dots and red dots of the better color separated image are graphed in the optical density domain (FIG. 8) the RGB colors are converted to the optical density domain, and from there mapped to spherical coordinates, and here the azimuth and elevation angles, derived from spherical coordinate representation, are plotted as the red-vs-black color separation can be better explained using these two axes), the red and black dots are separated from each other and have minimal overlap. As that overlap increases, depicted in the lower graphic representation of FIG. 8, the discernibility between red and black dots decreases.

As used herein, the term "most suitable z-layer" is a z-layer that, compared to other z-layers in a given z-stack, contains features that are well focused and have clearly discernible color features such that differently colored features may be recognized from each other. For example, if an image comprises black dots and red dots (e.g. from pretreatment of the tissue sample with dual ISH probes), the most suitable layer will have dots that are well focused, and the black and red dots will be clearly identifiable and discernible from each other, optimally such that the black dots appear black and the red dots appear red. Of course, this concept may be applied to any assay signals, not just red and black signals.

Figure 4:
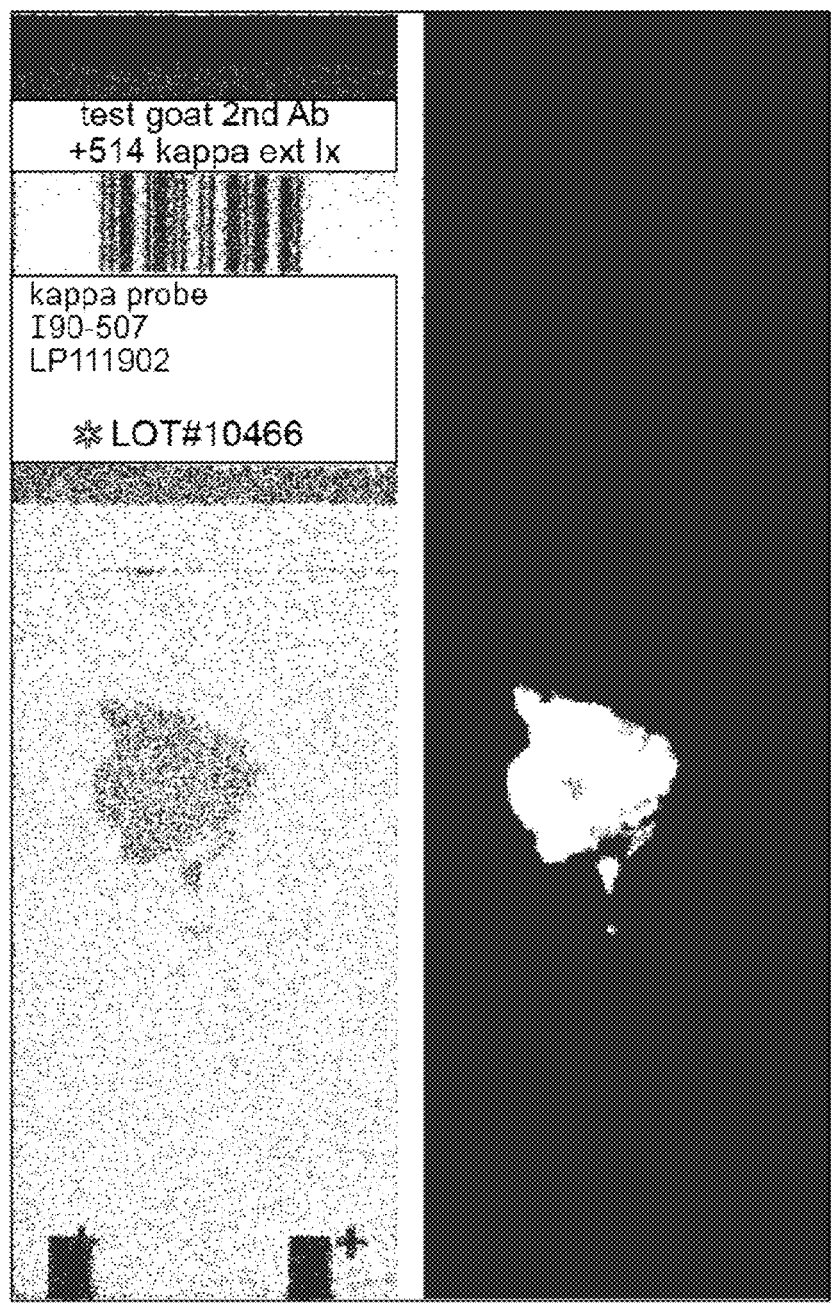
FIG. 4 shows a tissue specimen captured in a whole slide scan and also shows the results of application of an algorithm to determine an area of interest of the whole slide scan (note that here the slide thumbnail is of an H&E image and not of a Dual ISH slide, and this thumbnail is provided for illustrative purpose only to give a visual feel of the tissue region extraction problem)

Prior to determining the most suitable z-layer, in some embodiments, an area of interest (AOI) of a tissue specimen of a whole slide scan is first found by running an AOI module on the computer system, as known to those of skill in the art. An example of a tissue specimen where an AOI is computed is shown in FIG. 4. The AOI detection module, in some embodiments, returns a probability map, where each pixel denotes how likely it is to belong to tissue as compared to glass. Focus points are then allocated based on where the probability of tissue being detected is higher. Then tiles are considered around each focus point. For each tile, z-stacking is done with the aim of finding the most suitable z-layer in a given z-stack. After the most suitable z-layer is found (e.g. by using the focus metric module described herein) for each tile around a focus point, 2D interpolation is performed to estimate the best z-layer for intermediate tiles. Given this, a full scanned image using the interpolated z-layers may be captured.

In some embodiments, program instructions are run to retrieve and/or input a series of images, with each image corresponding to a particular z-layer in a given z-stack of images. Program instructions are then run to determine a number of metrics for each image; the metrics are based on identifiable features, such as focus features and color separation features. Once the focus and color separation metrics are determined, the instructions are then executed to evaluate the metrics and, in general, determine whether focus metrics, color separation metrics, or a combination of focus and color separation metrics better guide the selection of the most suitable z-layer within a given z-stack.

Figure 2:
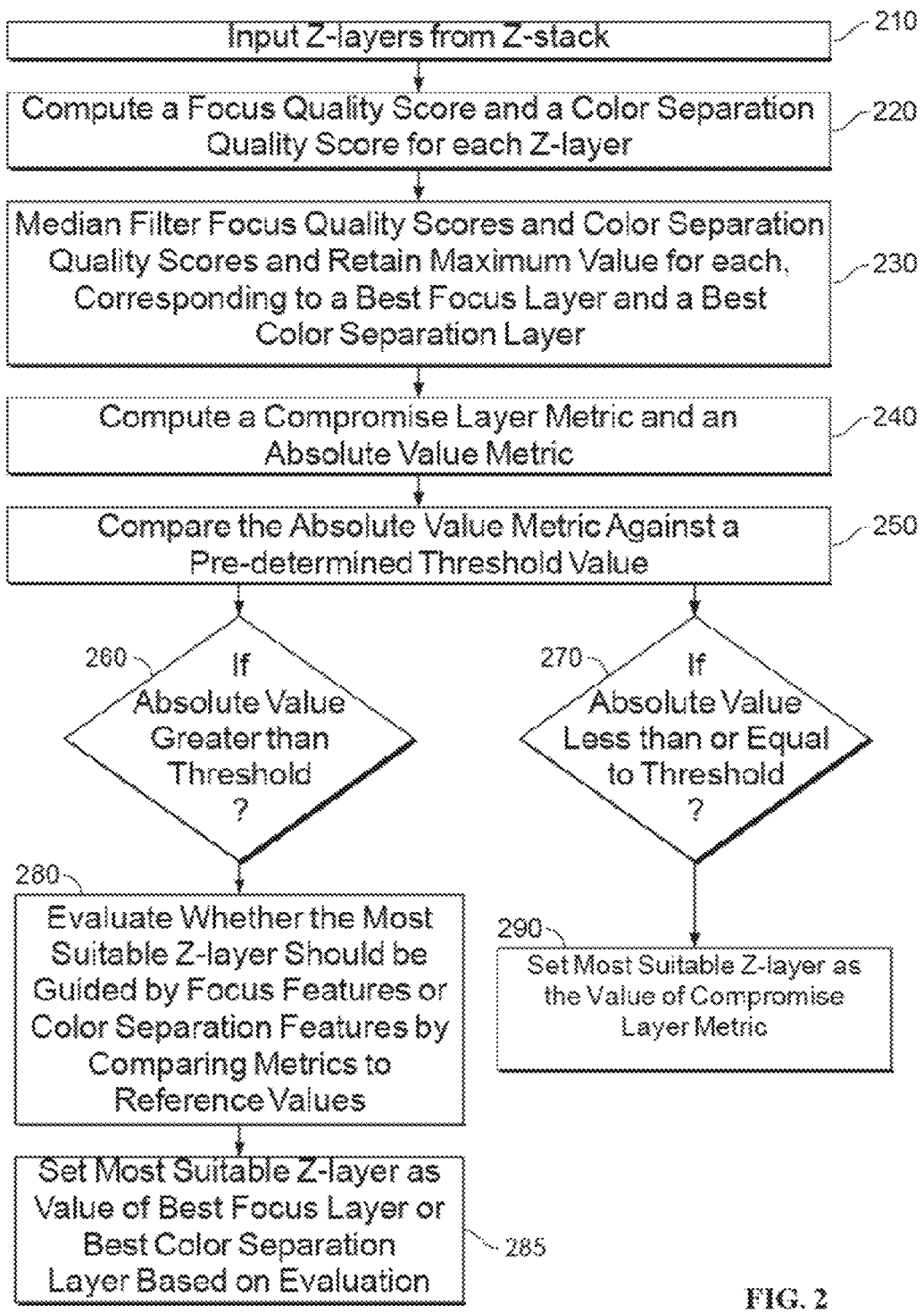

More specifically, the computer systems 14 include one or more processors that are programmed with a series of computer-executable instructions that are stored in a memory. With reference to the flowchart of FIG. 2, when executed the instructions cause the one or more processors and/or the memory of the computer system to receive a series of digital images (step 210), wherein each digital image corresponds to a particular z-layer in a given z-stack of scanned images. The computer system then executes instructions that cause one or more of the processors to compute focus metrics and color separation metrics for each z-layer in the z-stack, wherein the metrics are derived from focus features and color separation features, respectively within the images. In some embodiments, the metrics include focus quality scores and color separation quality scores for each z-layer in the given z-stack (step 220). In some embodiments, the color separation scores are red-versus-black (R/B) separation quality scores. Additional metrics computed include a z-layer having the best focus as compared with other z-layers in the given z-stack 230; a z-layer having the best color separation as compared with other z-layers in the same z-stack (step 230); a compromise layer metric (step 240); and an absolute value metric (step 240). Each of these metrics, including how they are derived and evaluated to determine the most suitable z-layer for further processing are described herein.

In some embodiments, each of the focus and color separation metrics are computed in an optimized color space, e.g. the color space that is believed to provide the best quality focus score or color space separation quality score. In some embodiments, the focus and color separation metrics are each computed in a color space optimized for stains or assays in which the tissue specimens were subjected. In some embodiments, the derived images are obtained based on a function applied on the three color channels (red, green, and blue) where the best function used to combine the color channels has been empirically determined (as applied to dual ISH and as could be applied to other ISH protocols utilizing different chromogens, etc.). This is in contrast to the prior art where only the green channel was utilized.

The most common representation of color in digital images is the RGB model, referring to the color channels red, green, and blue. For the RGB model, the color of any particular pixel can be represented by a three-dimensional vector (r, g, b) that provides the respective color intensities. There are different images derived from the RGB color space which are linear combinations (or other functions) of the RGB color space and, it is believed, that a particular, optimized linear combination provides improved focus quality scores and color separation quality scores as compared with the prior art (where quality scores were computed using sum of squared difference based cost computed on Green channel, which was not optimized for Dual ISH and which could not capture the double constraints of good focus and good red versus black color separation). In some embodiments, the optimization has been empirically conducted by studying different possible linear combinations of the form: Red+a*Green+b*Green, where a and b are both varied from −1 to 1 in steps of 0.2, and the 3 color channels have been considered in their original 8-bit and in optical density domain representation.

In some embodiments, the color channels for computation of the focus and color separation metrics are empirically determined. For example, by using ground truth data collected by manually assigning focus and color separation scores to z-stacks, the best color channels for estimating focus and color separation were empirically determined. The "ground truthing" applied is described in Examples 2 and 3 herein. As described in Example 2, empirical determination of the color space which provided optimized quality scores were computed with a 2-pixel difference based metric on (R+a*G+b*B), where $-1<=a<=1$, and $-1<=b<=1$, and the experiments were conducted in both the RGB domain and in the optical density domain (optical density representation (ROD, GOD, BOD) of a pixel (R,G,B) in 0-255 (8 bit) range is: ROD=−log(R/BK); GOD=−log(G/BK); BOD=−log(B/BK); where BK was an assumed background intensity of 240.

In the context of dual ISH for the detection of HER2 where black and red dots are identifiable features, it is believed that the best image channel to use for the focus quality score computation is (R−0.75*G−1*B), where all the channels are computed in the optical density domain. For the same dual ISH protocol, it is believed that the best image channel to use for the color separation score computation (here a red-vs-black separation score computation), is (R−0.5*G−0.5*B), where all channels are in RGB (each pixel has values in [0-255]) domain. The skilled artisan will be able to empirically determine other suitable combinations of image channels for other assays, including dual ISH assays utilizing detectable markers having any differing and discernible wavelengths. Of course, the skilled artisan will also be able to develop algorithms to determine optimized derived images, whereby the algorithms may be run prior to focus quality score computation and color separation quality score computation without changing the effect of the presently disclosed disclosure. It is believed that the optimization basically obtains a "better" function to combine the information from red, green and blue channels to a single derived image; where a "better" function is one where the cost, such as sharpness of focus in our example, computed on the derived image obtained using that function, is higher than the same cost computed on another derived image obtained using any other function.

To determine the focus score (step 220), a sum of squares difference based cost function is utilized, where $$J=\Sigma x \Sigma y[(|R(x,y)-R(x,y-2)|^2)-0.75(|G(x,y)-G(x,y-2)|^2)-1(|B(x,y)-B(x,y-2)|^2)];$$

for all x,y, where R(x,y) refers to the pixel in the x-th row and y-column of the red optical density channel; G(x,y) refers to the pixel in the x-th row and y-column of the green optical density channel; and B(x,y) refers to the pixel in the x-th row and y-column of the blue optical density channel, where red, green and blue channels have been derived from the source RGB image, and these 3 color channels are then converted to their optical density representation. For the old focus method, the focus score is computed as: $J=\Sigma x\Sigma y(|G(x,y)-G(x,y-2)|^2)$; thus the sum of squared difference between every two consecutive pixels is used, considering only the green channel.

Likewise, to determine the color separation score 220, a sum of squares difference based cost function is utilized, where $$J=\Sigma x\Sigma y[(|R(x,y)-R(x,y-2)|^2)-0.5(|G(x,y)-G(x,y-2)|^2)-0.5(|B(x,y)-B(x,y-2)|^2)];$$

for all x,y, where R(x,y) refers to the pixel in the x-th row and y-column of the red channel; G(x,y) refers to the pixel in the x-th row and y-column of the green channel; and B(x,y) refers to the pixel in the x-th row and y-column of the blue channel, where red, green and blue channels have been derived from the source RGB image.

Once the focus quality score values and color separation quality score values (step 220) are determined for each z-layer in the given z-stack, the computer system then executes instructions that cause one or more of the processors to evaluate the metrics and determine whether focus metrics, color separation metrics, or a combination of focus and color separation metrics should guide selection of the most suitable z-layer in a given z-stack (e.g. steps 260 through 290).

In some embodiments, further metrics for evaluation include (1) the z-layer having the best focus as compared with other z-layers in the z-stack; (2) the z-layer having the best color separation as compared with other z-layers in the same z-stack; (3) a compromise layer metric; and (4) an absolute value metric.

In some embodiments, the computer system further comprises instructions (step 230) to compute the z-layer having best focus and the z-layer having best color separation by applying an algorithm to independently median filter the focus and color separation quality scores and then identify a maximum value for the median filtered focus quality scores and a maximum value for the median filtered color separation quality scores.

For example, the z-layer having the best focus may be achieved median filtering the focus vectors (the focus quality score of each z-layer in the z-stack) using, e.g. a 3×1 window, and then determining the maximum to obtain the z-layer having best focus (LF). Those of skill in the art will be able to adjust a window size as needed. Likewise, the z-layer having the best color separation may be achieved by the computer median filtering the color separation vectors (the color separation quality score of each z-layer in the z-stack) using, e.g. a 3×1 window, and then determining the maximum to obtain the z-layer having best color separation.

Program instructions (step 240) are also executed to calculate a compromise layer metric (L) which is determined by averaging the z-layer having best focus value (LF) and the z-layer having best color separation value (LBR), e.g. L=(LF+LRB)/2.

Program instructions (step 240) are then further executed to compute an absolute value metric, wherein the absolute value metric is an absolute value of the difference between the z-layer having best focus and the z-layer having best color separation, e.g. absolute value metric=abs|LF−LRB|. Given the various metrics, the computer system may evaluate whether the identification of a most suitable z-layer should be guided by focus features, color separation features, or a combination thereof.

In some embodiments, the computer system receives instructions to compare the absolute value metric to a pre-defined threshold (step 250). For example, the computer system may receive instructions to evaluate whether the absolute value metric is greater than, equal to, or less than a pre-defined threshold, i.e. abs|LF−LRB|>threshold; abs|LF−LRB|<threshold; or abs|LF−LRB|=threshold.

The threshold may be a maximum allowed difference between a best layer for focus and a best layer for color separation. In some embodiments, the threshold is set to a integer less than half of the total number of z-layers. For example, given a z-stack comprising between about 12 to about 16 z-layers, the threshold may be between about 6 to about 8. In other embodiments, the threshold ranges from about 4 to about 8. In one embodiment, the threshold is 6.

If the computer determines that the absolute value metric is less than or equal to the threshold (step 270), then the computer sets the most suitable z-layer in a given z-stack as the value of the compromise layer metric (L) (step 290). The idea is that a combination of focus metrics and color separation metrics guides the determination of the most suitable layer since the spacing in the z-axis between z-layers in this instance is small (in scanning experiments, the z-layer difference between successive layers is kept at about 0.25 microns).

On the other hand, if the absolute value metric is greater than the threshold (step 260), instructions are then executed (step 280) to determine whether a focus feature or a color separation feature is a more important feature in identifying the most suitable z-layer. For example, a layer focus comparator (LFC) may be compared to a reference focus value (e.g. LFC=(focus at LF)/focus_reference)) and a layer color separation comparator (LRBC) may be compared to a color separation reference value (e.g. LRBC=(Red-black-separation at LRB)/Red_black_reference). When compared, if the LFC value is greater than the LRBC value, then the computer sets the z-layer having best focus (LF) as the most suitable z-layer; otherwise, the computer sets the most suitable z-layer as the z-layer having best color separation (LRB) (step 285).

The focus_reference and red-black-separation reference values are predetermined values and, in general, are average focus scores per tile and average color separation scores per tile, respectively. In some embodiments, the focus_reference is 0.175 and the Red_black_reference is 7.5, and these values were empirically derived through experiments, after collecting focus and red-vs-black separation scores from many good quality tiles and poor quality tiles.

If any of LF, LRB, or L are not integers, the computer is instructed to pick the next nearest integer (next nearest z-layer) whichever produces a better score with respect to the metric at hand (better focus, better color separation, or both). When focus and color separation values peak for different layers, preference is given to the next nearest z-layer having a better color separation. For example, if L is 2.3 and the next nearest z-layer representing best color separation is 3, not 2, then the computer is instructed to choose 3 over 2. The intuitive explanation for this is that the final task, for a trained pathologist, is to detect and count the red and black dots (dots being of good focus only indicate that they can easily be detected). However, when the color separation is better, it is easier to distinguish red and black dots and hence, score the Dual ISH image.

After the most suitable z-layer value is returned, instructions are provided, in some embodiments, to scan a tissue sample at the particular region identified and at a focus depth corresponding to the most suitable z-layer value. The image captured, e.g. a high resolution image, may be used for further processing, e.g. cellular scoring by a pathologist or via automation.

Quality Assessment Module

Another aspect of the present disclosure is an offline mode (hence runtime is not an issue) where given a whole slide scan, individual tiles of a pre-defined size are considered, and focus score, and red-vs-black separation scores, are computed based on an algorithm which can suggest to the pathologist which tiles are of "better quality" and hence are "better for scoring". This disclosure provides methods of computing the focus score and red-vs-black separation score per tile, along with the experiments behind ground truth creation, and obtaining the correlation between ground truth and computed quality metrics in order to identify the most useful quality metrics.

Therefore, in another aspect of the present disclosure is a method for automated quality evaluation of image tiles derived from a whole slide scan or an area of interest within a whole slide scan comprising (a) retrieving a series of digital image tiles, each digital image tile corresponding to a particular pixel area derived from a whole slide scan, wherein the digital images are captured from a tissue specimen; (b) computing focus metrics and color separation metrics for each digital image, wherein the focus metrics are derived from focus features in each image and the color separation metrics are derived from color separation features in each image; and (c) identifying those digital image tiles more suitable for downstream processing (i.e. those that are believed to be better quality image tiles and thus easier to review and/or score) based on the focus metrics and the color separation metrics. In some embodiments, the method further comprises generation of a heat map or an overlay (see FIGS. 5A and 5B), which may be superimposed over the whole slide scan or area of interest. Each of these steps will be described in further detail herein.

In some embodiments, the quality assessment module is run only for those tiles of a whole slide scan that have "stronger" foreground regions. For example, an area of interest determine may be performed to detect significant foreground regions in a whole slide image (e.g. in a low resolution image) and it is believed that this area of interest determination may expedite processing of the quality assessment module (which may comprise a high computing cost).

Following the identification of the significant tissue regions on the slide, each valid tissue region is divided into tiles of a given size. The tile size may be a predetermined size or may be based on an input provided by a user. Tile size selection is believed to be an important processing step since if too large an area is captured, the tile may contain both good quality data and bad quality data. On the other hand, if too small an area is captured, there may exist too little data (e.g. too few dots) from which to reliably estimate metrics and, eventually, a quality score. In some embodiments, the tile is sized about 300× about 300 pixels, or an area of about 90,000 square pixels. In other embodiments, the tile may be an area sized from about 40,000 square pixels to about 160,000 square pixels.

Once the area of interest is determined and an appropriate tile size is selected, a computer system then analyzes the image tiles and features contained therein to compute a plurality of focus metrics and color separation metrics. From the plurality of focus and color separation metrics, a focus quality score and a color separation quality score may be computed for each tile. In some embodiments, the metrics are multi-dimensional focus features and multi-dimensional color separation features. The focus quality and color separation quality scores are then used to provide guidance to a medical professional (e.g. a pathologist) in determining which field of view (FOV) to select for downstream cellular scoring.

Figure 3:
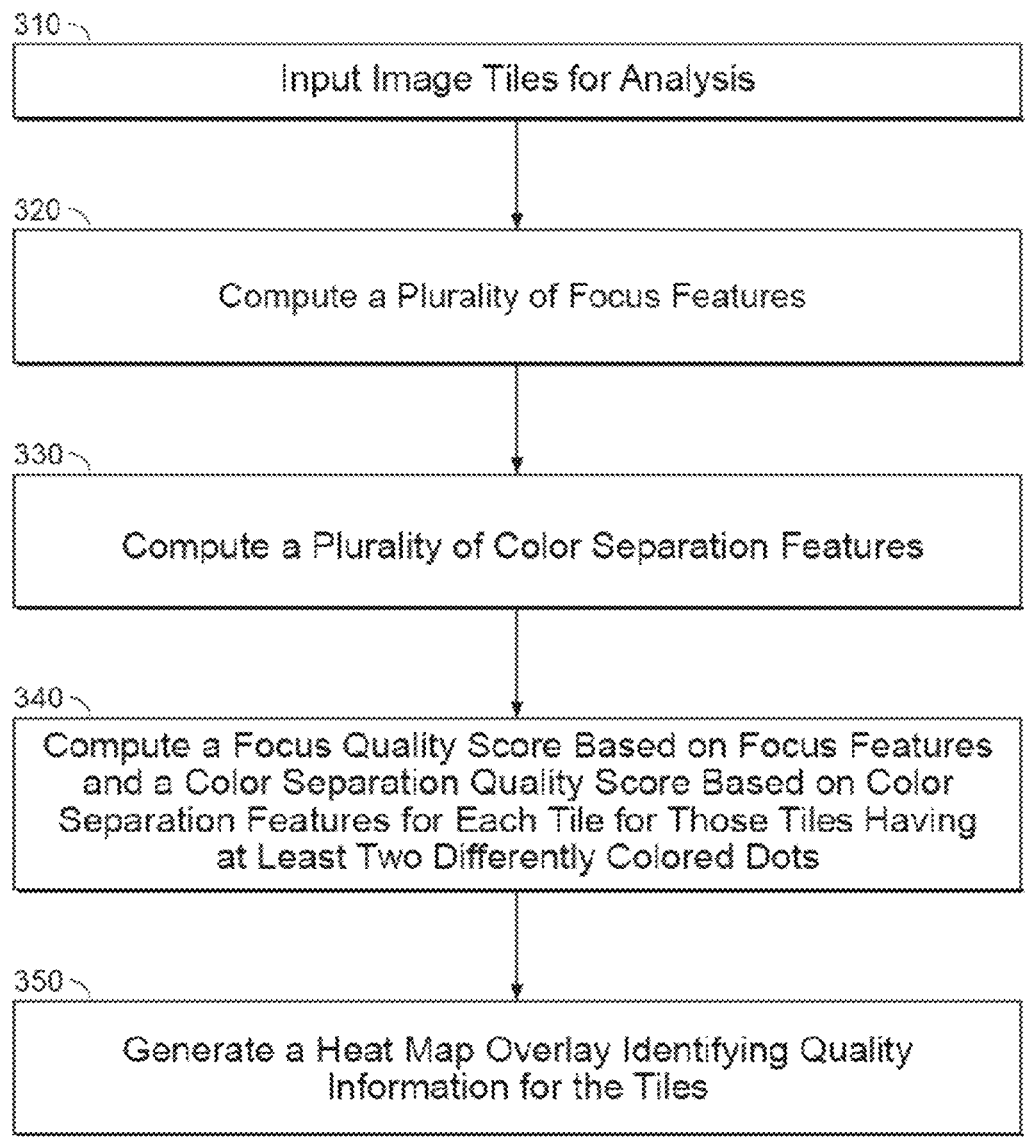

With regard reference to FIG. 3, in another aspect of the present disclosure is a computer-based system for determining particular tiles of a whole slide scan or particular areas of interest within a whole slide scan which may be better suited for scoring by a medical professional comprising a memory for storing images from the various tiles; and a processor that is configured to execute a sequence of instructions. In general, the method involves explicit dot detection and dot classification, followed by measurement of the separation between different signals in the stained tissue sample (e.g. differently colored dots) in a specific color space. Instructions are provided to the system to analyze the image tiles (310) and compute (i) a plurality of focus features (320), and (ii) a plurality of color separation features (330). From the plurality of focus features and the plurality of color separation features, focus and color separation quality scores may be computed (340). The computed quality scores may then be used to generate a visual representation of those tiles of a whole slide scan or an area of interest that may be more scoreable by a medical professional (step 350).

Focus Features

In some embodiments, dot locations may be determined by applying difference of Gaussian (DoG) filters. It is believed that the peaks of DoG correspond with likely dot locations and thus serves as a useful filter for detecting dot locations. Since the peak locations of the DoG filtered image correspond to dots, and more easily identifiable dots (e.g. those with better focus) correspond to higher magnitude in the DoG filtered image, the strength of the peaks of the DoG filtered image and statistics derived therefrom are used as focus features herein. Examples of DoG filter based features include:

(1) mean/median of the 0th DoG filter (coarsest scale) for all dot pixels;

(2) mean/median of the 0th DoG filter for all the black pixels;

(3) mean/median of the max DoG values of the 0th filter for all the dot blobs; and (4) mean of the top 50% for the DoG values for the 0th filter for all the dot blobs.

The intuition behind coming up with these statistical features is to combine the information contained in all the dot locations in a DoG filtered image to a few meaningful terms—hence features such as mean/median of the DoG strength (or "DoG value") at all the estimated dot locations are used.

It has been empirically observed that using radial symmetry is also very effective in computing dot locations, and is a strong indicator of focus. (see Parvin, Bahram, et al. "Iterative voting for inference of structural saliency and characterization of subcellular events." Image Processing, IEEE Transactions on 16.3 (2007): 615-623, the disclosure of which is incorporated by reference in its entirety herein). In some embodiments, the above features based on mean/median based statistics computed on the DoG filtered image can be replaced by mean/median based statistics based on radial symmetry voting on the gradient magnitude image computed on the absorbance channel. The radial symmetry voting can be done using minimum and maximum radius values appropriate for the dot sizes commonly seen in Dual ISH images. In some embodiments, example values for radial symmetry voting include a minimum radius value of 1, a maximum radius value of 4, where the angle of the conical section used for radial symmetry voting can be set to pi/4 radians, and the pixels considered for radial symmetry voting can have gradient magnitude value exceeding 0.1. In some embodiments, for non-maximal suppression after radial symmetry voting, a neighborhood of about 2 pixels is used.

The skilled artisan will appreciate that these features may be computed in any sequence. The skilled artisan will also appreciate that the parameters of the filters, e.g. radii values, may be altered such as to capture dots of different sizes.

Color Separation Features

In some embodiments, color separation features are computed by running various color separation filters to distinguish differently colored dots. For example, color separation features may be computed to distinguish between black dots and red dots (and vice versa). In some embodiments, color deconvolution is performed on the collected images based on the various constituent color vectors (in the specific Dual ISH example exemplified here, the main constituent colors are black and red, for the HER2 and Chromosome 17 gene expressions, respectively and there can be falsely identified dot pixels which are blue in color as they belong to the cell nucleus stained with haematoxylin). Using the color information, the system may classify dot pixels into red dots and black pixels, or blue (if it is a falsely identified dot pixel).

Color deconvolution is a method where for a given image pixel, the contributions of the different stain vectors, that combine together to create that single pixel, are computed using as input the knowledge of the ground truth stain vectors. (See, Ruifrok, Arnout C., and Dennis A. Johnston. "Quantification of histochemical staining by color deconvolution." *Analytical and quantitative cytology and histology/the International Academy of Cytology [and] American Society of Cytology* 23.4 (2001): 291-299, the disclosure of which is incorporated by reference in its entirety). Color deconvolution ("unmixing") is described further herein. In some embodiments, the ground truth color components typically correspond to the colors of the individual stains or probes to which the tissue sample was treated. As such, the new color components span a new color space that, in some embodiments, allows for viewing of a single color (e.g. red for red dots) at a time.

In some embodiments, to detect color separation in an image, the at least some of the following features are determined:

(1) Amax (max of the smoothened version of A channel, where A is computed from RGB to LAB conversion);

(2) Asigmax (max of Asig, the sigmoid enhanced version of the smoothened version of A channel);

(3) a maximum in unmixed black channel (considering the unmixed black channel obtained after color deconvolution);

(4) a gradient value for various color channels—luminance (L), unmixed red (unmixed red channel obtained after color deconvolution), A channel (in L-A-B color space), Asig channel (sigmoid enhanced version of A channel), green channel;

(5) the DoG values in (i) the green channel, (ii) A channel, and (iii) optical density domain absorbance channel (given a RGB pixel, its optical density representation is (ROD, GOD, BOD) as shown in Eq 2; then absorbance OD=sqrt (ROD*ROD+GOD*GOD+BOD*BOD); and (6) a color domain features, based on modeling the color information (in optical density color space) in terms of ellipses, where the ellipses are then fitted to different colored pixels (e.g. black and red dot pixels) separately, and then certain features are computed based on how separated the different colored ellipses are from each other (e.g. how different a black ellipse is from a red ellipse). In general, the features computed from color domain separation ellipses include (a) mean and standard deviation for ellipses fitted to differently colored dots (e.g. black and red colored dots); (b) the distance between differently colored ellipses (e.g. between black and red ellipses); and (c) the dimensions of color ellipses. An example of ellipse fitting to red and black dots is described in Example 4 herein. Specific features derived from ellipse fitting, which may be used in computing the various metrics needed for quality score determination, are FIG. 8, wherein the top graph shows comparatively better dot separation (as compared with the lower graph) resulting in a comparatively better discrimination between the black dots and the red dots in the cellular images.

Once the various focus features and color separation features have been computed, the computer executes instructions to compute focus quality scores and color separation quality scores for all image tiles classified as having at least one of each differently colored dot (again, the dots corresponding to different in situ hybridization signals in the images derived from the tissue sample). For example, and in the context of Dual ISH, focus scores and color separation scores are computed only for those tiles having at least one black dot and at least one red dot. The reason behind this is that according to the Dual ISH scoring guidelines, a trained pathologist considers only those cells for scoring which have at least one black dot and one red dot.

In some embodiments, instructions are provided to combine the various focus features (e.g. multi-dimensional focus features) into a single focus feature value. Likewise, the various color separation features (e.g. multi-dimensional color separation features) are combined into a single color separation feature value.

In some embodiments, the various focus and various color separation features, respectively, are combined using a generalized linear regression algorithm, as known in the art. Generalized linear regression is a modification of the ordinary linear regression that allows error distribution models other than that provided by a conventional normal distribution for linear fitting of data with ground truth. As such, given "n" d-dimensional vectors (x1, x2, x3, . . . , xn), with "n" corresponding ground truth scores (g1, g2 . . . gn), where xi={xi1, xi2, . . . , xid}, instructions are provided to compute a d-dimensional weight vector w=(w1 w2 . . . wd), such that an inner product of each xk with w will be similar to gk. This computation may be achieved, for example, with "glmfit" in Matlab where normal distribution is used to model the fitting error. (See, for example, Dobson, A. J. An Introduction to Generalized Linear Models. New York: Chapman & Hall, 1990; McCullagh, P., and J. A. Nelder. Generalized Linear Models. New York: Chapman & Hall, 1990; and Collett, D. Modeling Binary Data. New York: Chapman & Hall, 2002).

Examples of ground truths used as input in this process are exemplified in Examples 2 and 3.

Two weight vectors are derived from the linear regression. A first weight vector is computed based on the multi-dimensional focus features (WF); and a second weight vector is computed based on the multi-dimensional color separation features (WRB). Using, for example, "glmfit" on the multi-dimensional focus features and studying its correspondence with the ground truth inputs for focus, the inner product between WF and a focus feature allows the computation of a focus quality score for a given focus feature. Similarly, using "glmfit" on the multi-dimension color separation features and studying its correspondence with the ground truth inputs of color separation, the inner product between WRB and a color separation feature allows the computation of a color separation quality score for a color separation indicating feature.

Once the focus score and color separation score are computed for each image tile, instructions are executed to return a pre-determined or user defined number of regions which may represent the better quality regions for the given image. This is demonstrated in Example 7 herein.

In some embodiments, the better quality regions may be displayed visually to a medical professional. In some embodiments, the visual representation may be in the form of a "heat map." In some embodiments, the heat map may be color coded, e.g. warm colors like red or orange and cool colors like blue or purple to delineate the range of quality tiles. Advantageously, a "heat map" is generated wherein the pseudo colors, applied to positions on a map, correspond spatially to the image, and the colors are chosen to represent quality assessments of the tiles. A heat map may be generated, in some embodiments, by applying a low pass filter to an image of a whole tissue slide or an area of interest. The generation of heat maps of marker expression are more fully described in PCT/EP/2015/062015, entitled "An Image Processing Method and System for Analyzing a Multi-Channel Image Obtained From a Biological Tissue Sample Being Stained By Multiple Stains," the disclosure of which is hereby incorporated by reference herein in its entirety.

Figure 5A:
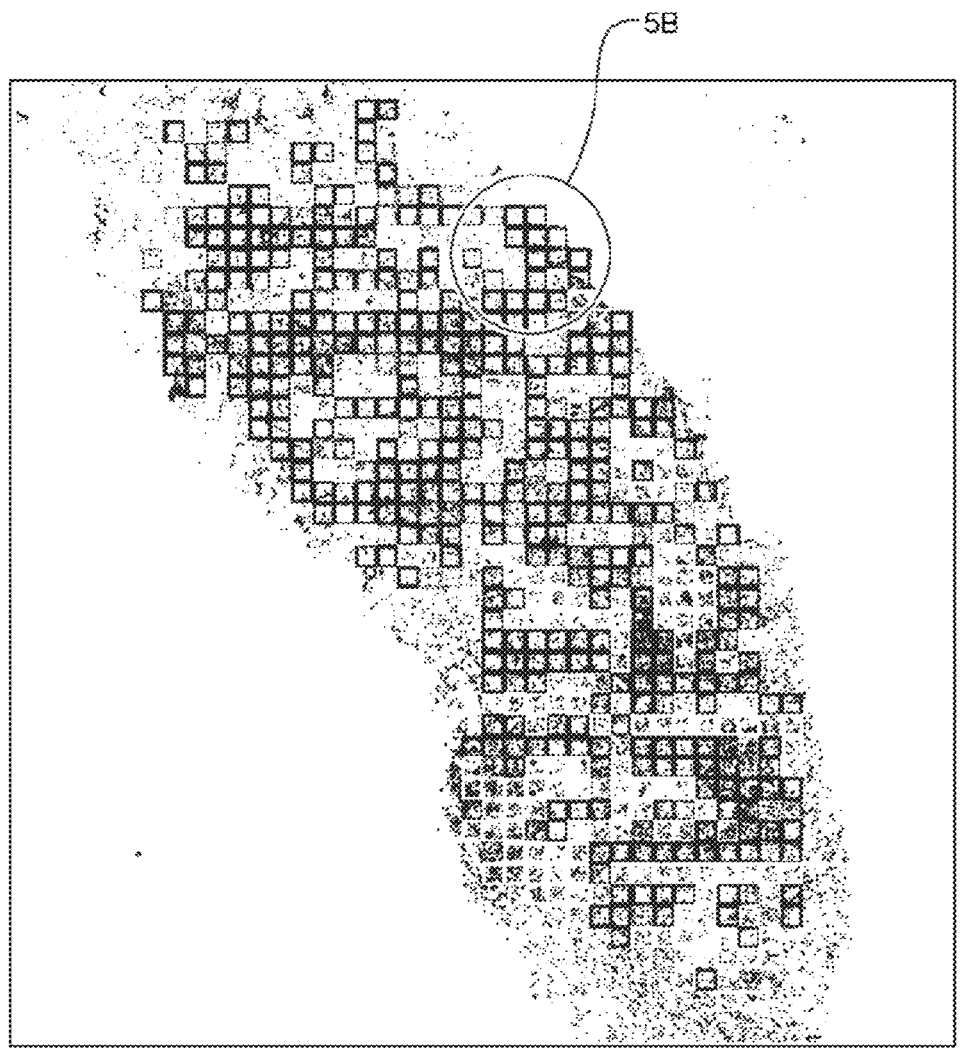
FIG. 5A shows an example of a heat map, where the shading of each tile indicates the quality (ease of scoring) of the tiles.
Figure 5B:
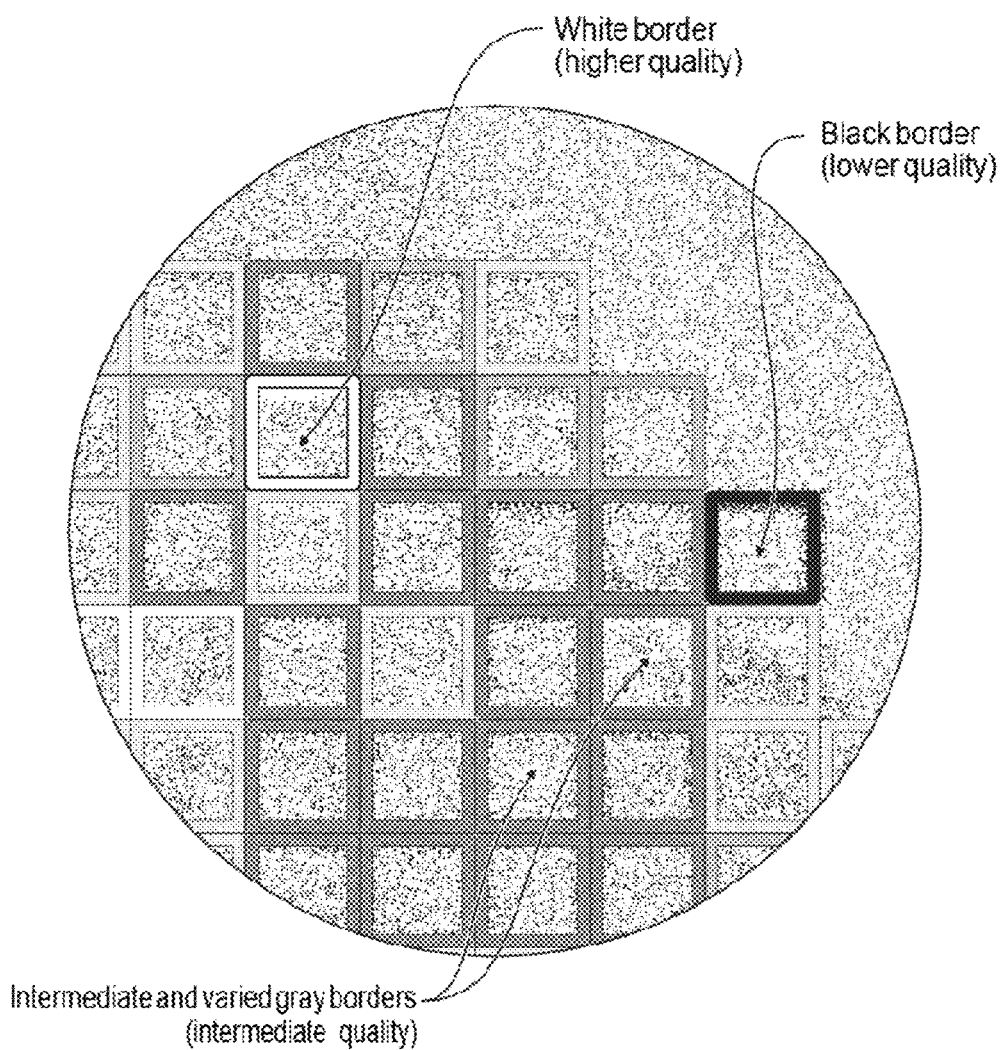
FIG. 5B is an exploded view of an area within FIG. 5A, again showing differently shaded tiles.

In some embodiments, instructions may be provided to generate an annotation file (e.g. xml), where the annotation file is used to render a bounding box around each valid tissue tile. In some embodiments, the annotation file also includes other textual information (e.g. focus score, color separation score, and the number of differently colored pixels). The color of the annotation xml per tile indicates how useful a tile is, such as by an ease-of-scoring point of view. An example is shown in FIGS. 5A and 5B. For example, a tile may be "black" in the annotation xml file if the region is not of scoreable quality, and may be colored "white" if the region is of "good quality" and is "well scoreable." Of course, any color may be assigned to any tile provided a key or legend is provided to give meaning to each color.

When the medical professional examines a whole slide image, the professional assumes the responsibility of selecting a proper field of view (FOV) from where 20 cells may be selected for downstream scoring. To automate the process, the aforementioned steps may be carried out to return quality scores for each individual tile (where the tile size is pre-determined) and then, based on the quality scores and the number of differently colored dots returned per tile, descriptors such as "good/bad/in-between" may be assigned to all the tiles. Normally, if a quality metric (focus or color separation) is reasonable enough, any generated heat map may help the medical professional consider the more "scoreable" area (assigned high scores by the quality metrics), thus assisting the medical professional in selecting good FOVs for downstream cell based scoring. Thus, it is believed, that the generation of a heat map is not intended to replace the medical professional in FOV selection, but to provide guidance to the medical professional in FOV selection, therefore allowing the task to be simpler, faster, and/or more accurate. In FIG. 5A, the heat map is superimposed on a low resolution image, where white tile borders ("white tiles") denote higher quality regions and black tile borders ("black tiles") denote poorer quality regions. Intermediate quality tiles may be shown in various shades of grey and respectively denote various intermediate levels of quality. FIG. 5B provides an exploded view of a portion of FIG. 5A, with white tiles, black tiles, and grey shaded tile borders. Any number of differently shaded borders may be used in the heat map, as well as different colors and shadings of colors. In some embodiments, along with the tile shading and/or color, there is textual information associated with each tile that captures information, including focus score, red-vs-black color separation score, number of red dots in the tile, and number of black dots in the tile.

Any of the images evaluated by the computer system may be pre-processed prior to any identification of features, computation of metrics, or evaluation by the computer system. For example, noise reduction filters and other enhancing filters may be run as known to those of ordinary skill in the art. The intuition behind using noise reduction filters is to remove small objects of discontinuity (e.g. small areas of speckling and dust, can be removed by median filtering, and hence spurious dots will not picked up in these noisy regions; similarly, inside a cell which contains red and black dots, DoG filtering can enhance the visual distinctiveness of the dots and make them easier to pick up). The processes disclosed herein may also be repeated any number of times to evaluate any desired areas of interest.

The computer system of the present disclosure may be tied to a specimen processing apparatus which can perform one or more preparation processes on the tissue specimen. The preparation process can include, without limitation, deparaffinizing a specimen, conditioning a specimen (e.g., cell conditioning), staining a specimen, performing antigen retrieval, performing immunohistochemistry staining (including labeling) or other reactions, and/or performing in situ hybridization (e.g., SISH, FISH, etc.) staining (including labeling) or other reactions, as well as other processes for preparing specimens for microscopy, microanalyses, mass spectrometric methods, or other analytical methods.

A specimen can include a tissue sample. The sample of tissue can be any liquid, semi-solid or solid substance (or material) in or on which a target can be present. In particular, a tissue sample can be a biological sample or a tissue sample obtained from a biological tissue. The tissue can be a collection of interconnected cells that perform a similar function within an organism. In some examples, the biological sample is obtained from an animal subject, such as a human subject. A biological sample can be any solid or fluid sample obtained from, excreted by or secreted by any living organism, including without limitation, single celled organisms, such as bacteria, yeast, protozoans, and amoebas among others, multicellular organisms (such as plants or animals, including samples from a healthy or apparently healthy human subject or a human patient affected by a condition or disease to be diagnosed or investigated, such as cancer). For example, a biological sample can be a biological fluid obtained from, for example, blood, plasma, serum, urine, bile, ascites, saliva, cerebrospinal fluid, aqueous or vitreous humor, or any bodily secretion, a transudate, an exudate (for example, fluid obtained from an abscess or any other site of infection or inflammation), or fluid obtained from a joint (for example, a normal joint or a joint affected by disease). A biological sample can also be a sample obtained from any organ or tissue (including a biopsy or autopsy specimen, such as a tumor biopsy) or can include a cell (whether a primary cell or cultured cell) or medium conditioned by any cell, tissue or organ. In some examples, a biological sample is a nuclear extract. In certain examples, a sample is a quality control sample, such as one of the disclosed cell pellet section samples. In other examples, a sample is a test sample. For example, a test sample is a cell, a tissue or cell pellet section prepared from a biological sample obtained from a subject. In an example, the subject is one that is at risk or has acquired a particular condition or disease. In some embodiments, the specimen is breast tissue.

The processing apparatus can apply fixatives to the specimen. Fixatives can include cross-linking agents (such as aldehydes, e.g., formaldehyde, paraformaldehyde, and glutaraldehyde, as well as non-aldehyde cross-linking agents), oxidizing agents (e.g., metallic ions and complexes, such as osmium tetroxide and chromic acid), protein-denaturing agents (e.g., acetic acid, methanol, and ethanol), fixatives of unknown mechanism (e.g., mercuric chloride, acetone, and picric acid), combination reagents (e.g., Carnoy's fixative, methacarn, Bouin's fluid, B5 fixative, Rossman's fluid, and Gendre's fluid), microwaves, and miscellaneous fixatives (e.g., excluded volume fixation and vapor fixation).

If the specimen is a sample embedded in paraffin, the sample can be deparaffinized using appropriate deparaffinizing fluid(s). After the waste remover removes the deparaffinizing fluid(s), any number of substances can be successively applied to the specimen. The substances can be for pretreatment (e.g., protein-crosslinking, expose nucleic acids, etc.), denaturation, hybridization, washing (e.g., stringency wash), detection (e.g., link a visual or marker molecule to a probe), amplifying (e.g., amplifying proteins, genes, etc.), counterstaining, coverslipping, or the like.

The specimen processing apparatus can apply a wide range of substances to the specimen. The substances include, without limitation, stains, probes, reagents, rinses, and/or conditioners. The substances can be fluids (e.g., gases, liquids, or gas/liquid mixtures), or the like. The fluids can be solvents (e.g., polar solvents, non-polar solvents, etc.), solutions (e.g., aqueous solutions or other types of solutions), or the like. Reagents can include, without limitation, stains, wetting agents, antibodies (e.g., monoclonal antibodies, polyclonal antibodies, etc.), antigen recovering fluids (e.g., aqueous- or nonaqueous-based antigen retrieval solutions, antigen recovering buffers, etc.), or the like.

Probes can be an isolated nucleic acid or an isolated synthetic oligonucleotide, attached to a detectable label or reporter molecule. Labels can include radioactive isotopes, enzyme substrates, co-factors, ligands, chemiluminescent or fluorescent agents, haptens, and enzymes. For example, probes can include, without limitation, a hapten-labeled specific binding moiety, a DNA probe (e.g., DNP-labeled DNA probe), a nitroaryl compound, dinitrophenol, an electron-deficient aromatic compound, a probe hybridization solution, or other type of ISH probes. ISH can involve a labeled complementary DNA or RNA strand (i.e., probe) to localize a specific DNA or RNA sequence in a portion or section of tissue (in situ), or, if the tissue is small enough, in the entire tissue (whole mount ISH).

In some embodiments, a cocktail assay applied by the processing apparatus includes different reagents. For example, one cocktail assay includes the ULTRAVIEW SISH Detection Kit (Ventana Medical Systems, Inc., p/n 780-001), the INFORM HER2 DNA Probe (Ventana Medical Systems, Inc., p/n 780-4332), the Rabbit Anti-DNP Antibody (Ventana Medical Systems, Inc., p/n 780-4335), the Rabbit Anti-HER2 (4B5) Antibody (Ventana Medical Systems, Inc., p/n 800-2996), the ULTRAVIEW Universal Alkaline Phosphatase Red Detection Kit (Ventana Medical Systems, Inc., p/n 760-501), the silver wash (Ventana Medical Systems, Inc., p/n 780-002), and/or the INFORM Chromosome 17 Probe (Ventana Medical Systems, Inc., p/n 780-4331). Another cocktail assay is the INFORM HER2 Dual ISH DNA Probe sold by (Ventana Medical Systems, Inc.), which includes the INFORM HER2 Dual ISH DNA Probe Cocktail (Ventana Medical Systems, Inc., p/n 800-4422), the HybReady (Ventana Medical Systems, Inc., p/n 780-4409), the ultraView SISH DNP Detection Kit (Ventana Medical Systems, Inc., p/n 800-098), the ultraView Red ISH DIG Detection Kit (Ventana Medical Systems, Inc., p/n 800-505), the ultraView Siler Wash II (Ventana Medical Systems, Inc., p/n 780-003), and/or the HER2 Dual ISH 3-in-1 Xenograft Slides (Ventana Medical Systems, Inc., p/n 783-4332). Other cocktail assays can be used. Cocktail assays can be used to quantitatively detect amplification of the HER2 gene via two color chromogenic ISH in formalin-fixed, paraffin-embedded tissue specimens of human breast cancer and gastric cancer, including the gastro-esophageal junction, and can be an aid in the assessment of patients for whom Herceptin (trastuzumab) may be a treatment option. In yet other protocols, the cocktail assay is the VENTANA HER2 DNA Probe Assay sold by Ventana Medical Systems, Inc., p/n 800-4422. U.S. patent application Ser. No. 11/809,024 (corresponding to U.S. Patent Publication No. 2008/0299555) entitled MULTICOLOR CHROMOGENIC DETECTION OF BIOMAKERS and U.S. patent application Ser. No. 11/809,024 (corresponding to U.S. Patent Publication No. 2011/0136130) entitled METHOD FOR CHROMOGENIC DETECTION OF TWO OR MORE TARGET MOLECULES IN A SINGLE SAMPLE disclose substances, protocols, and specimen processing techniques and are incorporated by reference in their entireties.

The specimen processing apparatus can be an automated apparatus, such as the BENCHMARK XT instrument and SYMPHONY instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety. Alternatively, specimens can be manually processed.

After the specimens are processed, a user can transport specimen-bearing slides to the imaging apparatus. The imaging apparatus used here is a brightfield imager slide scanner. One brightfield imager is the iScan Coreo™ brightfield scanner sold by Ventana Medical Systems, Inc. In automated embodiments, the imaging apparatus is a digital pathology device as disclosed in International Patent Application No.: PCT/US2010/002772 (Patent Publication No.: WO/2011/049608) entitled IMAGING SYSTEM AND TECHNIQUES or disclosed in U.S. Patent Application Publication No. 2014/0178169, filed on Sep. 9, 2011, entitled IMAGING SYSTEMS, CASSETTES, AND METHODS OF USING THE SAME. International Patent Application No. PCT/US2010/002772 and U.S. Patent Application Publication No. 2014/0178169 are incorporated by reference in their entities. In other embodiments, the imaging apparatus includes a digital camera coupled to a microscope.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks). For example, the network 20 of FIG. 1 can include one or more local area networks.

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is to be noted that for Coreo and HT scanners, the green channel was used to compute focus metrics for scanning in general, and not for scanning for Dual ISH slides in particular; in this patent application, focus metrics have been proposed for Dual ISH scans in particular.

Methods of unmixing are well known to those of ordinary skill in the art and any method now known or later discovered may be used to "unmix" multiplex images into the vessel channel images. In general, the unmixing process extracts stain-specific channels to determine local concentrations of individual stains using reference spectra that are well known for standard types of tissue and stain combinations. For example, each pixel in an input image may comprise a mixture of component spectra including one or more quantum dots representing target structures, in addition to broadband signals such as DAPI and autofluorescence, as described above. The unmixing may use reference spectra retrieved from a control image or estimated from the image under observation. Unmixing the component signals of each input pixel enables retrieval and analysis of stain-specific channels, such as vessel channels and nuclei channels. The terms "unmixing" and "color deconvolution" (or "deconvolution") or the like (e.g. "deconvolving," "unmixed") are used interchangeably in the art.

In some embodiments, the multiplex images are unmixed using liner unmixing. Linear unmixing is described, for example, in 'Zimmermann "Spectral Imaging and Linear Unmixing in Light Microscopy" Adv Biochem Engin/Biotechnol (2005) 95:245-265' and in in C. L. Lawson and R. J. Hanson, "Solving least squares Problems", PrenticeHall, 1974, Chapter 23, p. 161,' the disclosures of which are incorporated herein by reference in their entirety. In linear stain unmixing, the measured spectrum ($S(\lambda)$) at any pixel is considered a linear mixture of stain spectral components and equals the sum of the proportions or weights (A) of each individual fluorophore reference spectral signature ($R(\lambda)$) that is being expressed at the pixel $$S(\lambda) = A_1 \cdot R_1(\lambda) + A_2 \cdot R_2(\lambda) + A_3 \cdot R_3(\lambda) \ldots A_i \cdot R_i(\lambda)$$

which can be more generally expressed as in matrix form as $$S(\lambda) = \Sigma A_i \cdot R_i(\lambda) \text{ or } S = R \cdot A$$

If there are M channels images acquired and N individual fluorophores, the columns of the M×N matrix R is the known reference spectral signature of the individual fluorophores and the N×1 vector A is the unknown of the proportions of individual fluorophores and the M×1 vector S is the measured multichannel spectral vector at a pixel. In these equations, the signal in each pixel (S) is measured during acquisition of the multiplex image and the reference spectra for the known stains are usually determined in an independent offline method from fluorescent specimens labeled with only a single stain using identical instrument settings. It becomes a simple linear algebra matrix exercise to determine the contributions of various stains (Ai) by calculating their contribution to each point in the measured spectrum. In some embodiments, the solution is obtained using an inverse least squares fitting approach that minimizes the square difference between the measured and calculated spectra by solving the following set of equations, $$[\partial \Sigma j\{S(\lambda j) - \Sigma i A_i \cdot R_i(\lambda j)\}2]/\partial A_i = 0$$

In this equation, j represents the number of detection channels and i equals the number of stains. The linear equation solution often involves allowing a constrained unmixing to force the weights (A) to sum to unity.

In other embodiments, unmixing is accomplished using the methods described in WO2014/195193, entitled "Image Adaptive Physiologically Plausible Color Separation," filed on May 28, 2014, the disclosure of which is hereby incorporated by reference in its entirety herein. In general, WO2014/195193 describes a method of unmixing by separating component signals of the input image using iteratively optimized reference vectors. In some embodiments, image data from an assay is correlated with expected or ideal results specific to the characteristics of the assay to determine a quality metric. In the case of low quality images or poor correlations against ideal results, one or more reference column vectors in matrix R are adjusted, and the unmixing is repeated iteratively using adjusted reference vectors, until the correlation shows a good quality image that matches physiological and anatomical requirements. The anatomical, physiological, and assay information may be used to define rules that are applied to the measured image data to determine the quality metric. This information includes how the tissue was stained, what structures within the tissue were intended or not intended to be stained, and relationships between structures, stains, and markers specific to the assay being processed. An iterative process results in stain-specific vectors that can generate images that accurately identify structures of interest and biologically relevant information, are free from any noisy or unwanted spectra, and therefore fit for analysis. The reference vectors are adjusted to within a search space. The search space defines a range of values that a reference vector can take to represent a stain. The search space may be determined by scanning a variety of representative training assays including known or commonly occurring problems, and determining high-quality sets of reference vectors for the training assays.

In other embodiments, unmixing is accomplished using the methods described in WO2015/124772, entitled "Group Sparsity Model for Image Unmixing," filed on Feb. 23, 2015, the disclosure of which is hereby incorporated by reference in its entirety herein. In general, WO2015/124772 describes unmixing using a group sparsity framework, in which fractions of stain contributions from a plurality of colocation markers are modeled within a "same group" and fractions of stain contributions from a plurality of non-colocation markers are modeled in different groups, providing co-localization information of the plurality of colocation markers to the modeled group sparsity framework, solving the modeled framework using a group lasso to yield a least squares solution within each group, wherein the least squares solution corresponds to the unmixing of the colocation markers, and yielding a sparse solution among the groups that corresponds to the unmixing of the non-colocation markers. Moreover, WO2015124772 describes a method of unmixing by inputting image data obtained from the biological tissue sample, reading reference data from an electronic memory, the reference data being descriptive of the stain color of each one of the multiple stains, reading colocation data from electronic memory, the colocation data being descriptive of groups of the stains, each group comprising stains that can be collocated in the biological tissue sample, and each group forming a group for the group lasso criterion, at least one of the groups having a size of two or above, and calculating a solution of the group lasso criterion for obtaining the unmixed image using the reference data as a reference matrix. In some embodiments, the method for unmixing an image may comprise generating a group sparsity model wherein a fraction of a stain contribution from colocalized markers is assigned within a single group and a fraction of a stain contribution from non-colocalized markers is assigned within separate groups, and solving the group sparsity model using an unmixing algorithm to yield a least squares solution within each group.

In a further aspect, the disclosure relates to an image analysis method for determining one of a plurality of z-layers in a z-stack of digital images, whereby the image of the determined z-layer is to be used for computing tissue-related or cell-related scores. The z-stack of digital images depicts different layers of a single tissue sample located on a slide. The z-stack images have been acquired by varying the focus of an optical sensor, e.g. the sensor of a slide scanning system. The method is implemented by an image analysis system and comprises:

for each of the z-layers, computing focus metrics. Each focus metric is an indicator of focus quality of the z-layer and is derived from image data of said z-layer;
for each of the z-layers, computing color separation metrics. Each color separation metric is an indicator of color separation quality of the z-layer and being derived from image data of said z-layer; and
evaluating the focus metrics and the color separation metrics and determining the one of the z-layers to be used for computing tissue-related or cell-related scores in dependence on the focus metrics and color separation metrics of each of the z-layers.

As used herein, "z" corresponds to a third dimension in space, wherein "x" and "y" correspond to first and second dimensions in space which correspond to the axes of the digital images, wherein x, y and z axes are orthogonal to each other. The units of the x and y axis of an image may be given in number of pixels while the unit of the z axis of the z-stack may be given as the index or number of a respective z-layer. For example, the z-stack may comprise 15 layers of images having been obtained from the same tissue sample on a particular slide, whereby each of said 15 images may correspond to a different focus setting of the optic sensor having been used for generating the z-stack of images.

Said features may be advantageous as the combination of focus score and color separation score may provide for a more robust and accurate way of identifying an image layer and corresponding image that is in-focus and in addition allows distinguishing different tissue features based on color separation. This may allow for better and more accurate results when performing downstream image processing, e.g. cell detection and dot classification. In a further advantageous aspects, at least some focus metrics and color separation metrics (in particular those not being based on the analysis of individual dots and tiles) can be computed very quickly, e.g. in real time, allowing the identification of a high quality z-layer image while the image scanning process is still going on.

According to embodiments, the method comprises analyzing selectively the one of the images in the z-stack of digital images that corresponds to the determined z-layer and selectively computing the tissue-related or cell-related scores for said analyzed image. This may result in a higher accuracy of the computed scores and may result in the reduction of CPU consumption as score computation is not performed for multiple layers of the z-stack but rather for the one image of the z-stack having the best combination of focus and color separation quality.

According to embodiments, the evaluation of the focus metrics and the color separation metrics comprises:

computing the difference between the z-layer having best focus and the z-layer having best color separation by computing an absolute value of the difference of the index position of the z-layer having best focus and the index position of the z-layer having best color separation in the z-stack; for example, in a z-stack of 15 layers, the best focus layer may have stack index 9 and the best color separation layer may have stack index 5. In this example, the difference of the z-layer having best focus and the z-layer having best color separation would be 9−5=4.
determining whether the computed difference is greater than, equal to, or less than a predetermined threshold value;
in case the computed difference is determined to be less than or equal to the predetermined threshold value: computing an average of the z-layer index of the z-layer having best focus and the z-layer index of the z-layer having best color separation, if the average of the z-layer index is an integer, identifying the one of the z-layers of the z-stack whose index position is identical to the computed average of the z-layer indices and using said one identified z-layer as the one z-layer to be used for computing the scores; in the above mentioned example, the average of the two z-layer indices would be (9+5)/2=7. In this case, the image at z-layer index=7 would be the one z-layer identified. If the average of the z-layer index is not an integer, identifying the two consecutive z-layers of the z-stack which lie next to the computed average of the z-layer indices; identifying the one of the two consecutive z-layers having the highest color separation metrics; and using said one identified z-layer as the one z-layer to be used for computing the scores. For example, the best focus and best color separation layers may have the z-index 9 and 6, the average of the two z-layer indices would be (9+6)/2=7.5. In this case, the two consecutive z-layers 7 and 8 would be identified. If for the image of z-layer 7 a higher color separation metrics was computed than for the image of z-layer 8, then the $7^{th}$ layer is the one selected layer. Otherwise, the $8^{th}$ layer is the one selected layer.

According to embodiments, in case the computed difference is determined to be greater than the predetermined threshold value, the method comprises:

comparing a focus score derived from the focus metrics of the z-layer image having best focus with a reference focus score for determining a deviation of the focus score and the reference focus score; the reference focus score is an empirically determined focus score obtained for a digital image (which may also be referred to as training digital image) depicting the same type of tissue sample whereby said digital image has been manually identified as being in-focus. For example, using the same type of tissues sample for computing a focus metrics and a reference focus score means that the tissue types for which the focus metrics and the reference focus score were computed are the same or similar, comprise the same or similar composition of biomarkers and were stained with the same staining protocol, the respective digital images having been acquired by the same or similar type of method and apparatus. The reference focus score is obtained before the z-stack of images is acquired. For example, a ground truth data set, also known as training data set or learning data set, may comprise a plurality of z-stacks of training digital images, each z-stack of training digital images depicting multiple layers of a respective training tissue sample. Focus metrics may be computed for each z-layer image and each of the training z-stacks of images. From one or more of the training digital images (of one or more of the z-stacks of training images) having been manually identified as in-focus images, the reference focus score is computed;

comparing a color separation score derived from the color separation metrics of the z-layer image having best color separation with a reference color separation score for determining a deviation of the color separation score and the reference color separation score, the reference color separation score being an empirically determined color separation score obtained for a digital image (which may also be referred to as training digital image) depicting the same type of tissue sample and having been manually identified as being a high quality color separation image; The pre-determination or pre-computation of the reference color separation score may be performed analogously as described for the reference focus score;

in case the deviation of the focus score from the reference focus score is greater than the deviation of the color separation score from the reference color separation score, using the z-layer image having best color separation for computing the scores.

For example, this comparison may involve a normalization of the focus scores and the color separation scores to make the score deviations comparable. For example, a normalized focus score NFS may be computed from a focus score FS computed for a particular z-layer image and from an average expected focus score AEFS according to the formula NFS=FS/AEFS. The average expected focus score AEFS may have been obtained empirically from averaged focus scores computed for a large number of in-focus and out-of-focus images. Likewise, a normalized color separation score NCSS may be computed from a color separation score CSS computed for a particular z-layer image and from an average expected focus score ACSS according to the formula NCSS=CSS/ACSS. The average expected focus score ACSS may have been obtained empirically from averaged focus scores computed for a large number of in-focus and out-of-focus images.

According to embodiments, in case the deviation of the color separation score from the reference color separation score is greater than the deviation of the focus score from the reference focus score, the method comprises using the z-layer image having best focus for computing the scores. As explained above, the focus scores and color separation scores may be normalized for making them comparable.

According to embodiments, the method further comprises:
computing, for each of the z-layers, a focus score by using the focus metrics of the digital image corresponding to the z-layer as input;
computing, for each of the z-layers, a color separation score by using the color separation metrics of the digital image corresponding to the z-layer as input;
identifying the z-layer having best focus and identifying the z-layer having best color separation. Said two z-layers are identified independently from each other.

According to embodiments, the identification of the z-layer having best focus comprises:
storing the focus score of each of the z-layers in a respective element of a focus score vector;
vector element-wise moving a smoothing-window across the focus score vector, whereby at each moving step of the smoothing window, an average or median of the focus scores in the focus score vector elements covered by the smoothing window are computed; typically, the smoothing-window covers at least three elements of the score vector. In other embodiments, the smoothing window may cover 4, 5 or even more elements of the focus score vector. If the number of z-layers and corresponding elements of the score vector is very high, the window may be larger and cover e.g. 5 or more elements;
generating a smoothed focus score vector whose elements comprise the averaged or median focus scores instead of the original focus scores of the focus vector; the elements at the beginning and end of the smoothed vector may still have the original values. Typically, the average or median is assigned to the vector element lying under the center of the sliding window;
identifying the one of the z-layers that corresponds to the element in the smoothed focus score vector comprising the maximum focus score value as the z-layer having highest focus score.

The smoothing of the score values may increase accuracy of selecting the one z-layer as score outliers may be reduced.

According to embodiments, the identification of the z-layer having best color separation comprises:
storing the color separation score of each of the z-layers in a respective element of a color separation score vector;
vector element-wise moving a smoothing-window across the color separation vector, whereby at each moving step of the smoothing window, an average or median of the color separation scores in the color separation score vector elements covered by the smoothing window are computed; the size of the smoothing window for the color separation score vector may be the same as described for the smoothing window of the focus score vector;
generating a smoothed color separation score vector whose elements comprise the averaged or median color separation scores instead of the original color separation scores of the color separation vector;
identifying the one of the z-layers that corresponds to the element in the smoothed color separation score vector comprising the maximum color separation score value as the z-layer having highest color separation score.

According to embodiments, the tissue sample has been stained at least with a first stain having a first color and with a second stain having a second color; the first and second colors differ from each other. The color separation metric may be an indicator of color separation quality of the first and the second color. The first and/or second stain may be for example a fluorescence stain, silver stain, hematoxylin stain or any other kind of stain used for staining tissue samples, cells, cell components and/or biomarkers. The "color" here means the light spectrum emitted from a particular stain irrespective of the underlying physical emission process (e.g. fluorescence, reflection, etc.). For example, the first stain may be a silver stain and the first color may be "black" (wherein black herein refers to a characteristic light spectrum emitted from silver-stained sample sections). The second stain may be a fluorescent stain and the second color may be red.

According to embodiments, each of the digital images is an RGB image. The computation of the color separation metrics comprises, for each of the digital images:

computing a derivative image from the digital RGB image by computing a first derivative value DER1 for each of the pixels in the digital RGB image according to $DER1=R+a_{CS}*G+b_{CS}*B$, where $-1 \leq a_{CS} \leq 1$, where $-1 \leq b_{CS} \leq 1$, wherein R, G and B are the red, green and blue components of the pixel intensity of said pixel in the RGB image, wherein $a_{CS}$ and $b_{CS}$ are parameter values having been empirically determined as values which, when used for computing color separation metrics, provide color separation metrics having predictive power in respect to color separation quality of an image;

computing a color separation metric $J_{CS}$ according to the formula $$J_{CS}=\Sigma_x\Sigma_y(|DER1(x,y)-DER1(x,y-s)|^2),$$

wherein x and y are the x and y coordinates of the pixels in the derivative image and s is a number of pixel distance positions, whereby s has been empirically determined as pixel distance positions that correlate with high $J_{CS}$ values in images of known, high color separation quality. The color separation metrics may be of particular relevance in respect to the capability to separate (e.g. output different values for) the colors of the stains used, e.g. in respect to the first and second color. In the example case of the z-stack comprising 15 z-layers, 15 derivative images and respective $J_{CS}$ values are computed.

According to embodiments, two or more of the focus metrics computed for a particular z-layer image of the z-stack are computed into a single focus score. Likewise, two or more of the color separation metrics computed for a particular z-layer image of the z-stack are computed into a single color separation score. For example, this may be performed by summing up or multiplying all the focus metrics computed for a particular z-layer image or applying an aggregation heuristics. Analogously, the computation of the color separation score may be performed by summing up or multiplying all the color separation metrics computed for a particular z-layer image.

According to embodiments, the method further comprises empirically determining the parameters $a_{CS}$ and $b_{CS}$ by:

obtaining a plurality of different candidate a-values and candidate b-values for $a_{CS}$ and $b_{CS}$, each candidate a-value and each candidate b-value lying in the range [−1; +1];

obtaining a plurality of training z-layers in a z-stack of training digital images, each training digital image being an RGB image having assigned a color separation score known to accurately indicate the color separation quality of the training image;

for each possible combination of a candidate a-value and a candidate b-value, and for each of the training images in the training z-stack, computing a derivative image according to the formula $DER1_{acand\text{-}bcand}=R+a_{CS\text{-}cand}*G\ b_{CS\text{-}cand}*B$, wherein R, G and B are the red, green and blue components of the pixel intensity of said pixel in the RGB training image, wherein $a_{CS\text{-}cand}$ and $b_{CS\text{-}cand}$ are one of the possible combinations of a candidate a-value and a candidate b value, and wherein $DER1_{acand\text{-}bcand}$ is the first derivative value computed for each pixel in the derivative image by using said one combination of candidate a- and b-values;

for each of said computed derivative images, computing a color separation metric $J_{CS.acand\text{-}bacand}$ according to the formula $$J_{CS.acand\text{-}bcand}=\Sigma x\Sigma y(|DER1_{acand\text{-}bacand}(x,y)-DER1_{acand\text{-}bacand}(x,y-s)|^2),$$

wherein x and y are the x and y coordinates of the pixels in the derivative image computed for one of the training images and for one combination of an a-candidate value and a b-candidate value, and s is a number of pixel distance positions, whereby s has been empirically determined as pixel distance positions that correlate with high $J_{CS}$ values in images of known, high color separation quality;

identifying the combination of candidate a- and b-values that correlate best with the color separation scores assigned to each of the training images and known to accurately indicate the color separation quality of said training image; and using the identified candidate a- and candidate b values as the parameter values $a_{CS}$, $b_{CS}$ having been empirically determined.

For example, the a-value and the b-value respectively may are varied in the range [−1,1] in steps of 0.2 for computing the candidate a- and b-values; so each of a and b can take up to 9 possible value and the set $(a_F, b_F)$ can have 9×9=81 possible parameter value pairs for the focus metric. The set of candidate $a_{CS}$ and $b_{CS}$ candidate values may be computed in the same way, thereby generating a set of 9×9=81 possible parameter value pairs for the color separation metric. For the 1140 images in the z-stack based training set, the correlation between the proposed features (s pixel differences using R+a*G+b*B) with the empirically determined GT scores is determined as described already before.

According to embodiments, each of the digital images is an RGB image. The computation of the focus metrics comprises, for each of the digital images:

computing an optical-density-domain image from the digital RGB image by computing a ROD, a GOD and a BOD value for each pixel of the RGB image according to:

$$ROD=-\log(R/BK), GOD=-\log(G/BK), BOD=-\log(B/BK),$$

wherein R, G and B are the red, green and blue components of the pixel intensity of said pixel in the RGB image, wherein BK is a background intensity value typical for tissue slide glass; [typically a value between 230-250, e.g. 240. The same BK value may be used for computing ROD, GOD and BOD. Thus, an optical-density-domain image is an image whose pixels respectively comprise a ROD, GOD and BOD value computed from the RGB values of a respective pixel of an original image as described;

computing a derivative image from the optical domain image by computing a second derivative value DER2 for each of the pixels in the optical-density-domain image according to $DER2=ROD+a_F*GOD+b_F*BOD$, where $-1 \leq a_F \leq 1$, where $-1 \leq b_F \leq 1$, wherein $a_F$ and $b_F$ are parameters having been empirically determined as values which, when used for computing focus metrics, provide focus metrics having predictive power in respect to whether an image is in-focus;

computing a focus metric $J_F$ according to the formula $$J_F = \Sigma_x \Sigma_y (|DER2(x,y) - DER2(x,y-s)|^2),$$

wherein x and y are the x and y coordinates of the pixels in the derivative image and s is a number of pixel distance positions, whereby s has been empirically determined as pixel distance positions that correlate with high $J_F$ values in images known to be in-focus. $S_{CS}$ and $S_F$ may be identical, e.g. 2 pixel, 3 pixel or 4 pixel.

According to embodiments, the method further comprises empirically determining the parameters $a_F$ and $b_F$ by:

obtaining a plurality of different candidate a-values and candidate b-values for $a_F$ and $b_F$, each candidate a-value and each candidate b-value lying in the range [−1; +1];

obtaining a plurality of training z-layers in a z-stack of training digital images, each training digital image being an RGB image having assigned a focus score known to accurately indicate whether the training image is in-focus;

computing a training optical-density-domain image for each of the training images by computing a ROD, a GOD and a BOD value for each pixel of the training image; the computation of the ROD, a GOD and a BOD values is performed like already explained above;

for each possible combination of a candidate a-value and a candidate b-value, and for each of the training optical-density-domain images in the training z-stack, computing a derivative image according to the formula $DER2_{acand-bcand} = ROD + a_{F-cand}*GOD + b_{F-cand}*BOD$, wherein ROD, GOD and BOD respectively are components of a pixel in the training optical-density-domain image, wherein $a_{F-cand}$ and $b_{F-cand}$ are one of the possible combinations of a candidate a-value and a candidate b-value and wherein $DER2_{acand-bcand}$ is the second derivative value computed for each pixel in the derivative image by using said one combination of candidate a- and b-values;

for each of said computed derivative images, computing a focus metric $J_{F.acand-bacand}$ according to the formula $$J_{F.acand-bcand} = \Sigma x \Sigma y (|DER2_{acand-bacand}(x,y) - DER2_{acand-bacand}(x,y-s)|^2),$$

wherein x and y are the x and y coordinates of the pixels in the derivative image computed for one of the training images and for one combination of an a-candidate value and a b-candidate value, and s is a number of pixel distance positions, whereby s has been empirically determined as pixel distance positions that correlate with high $J_F$ values in images of known focus quality;

identifying the combination of candidate $a_{F-cand}$ and $b_{F-cand}$-values that correlate best with the focus scores assigned to each of the training images and known to accurately indicate the focus quality of said training image; and using the identified candidate $a_{F-cand}$ and candidate $b_{F-cand}$ values as the parameter values $a_F$, $b_F$ having been empirically determined.

For example, the focus scores assigned to each of the training images and known to accurately indicate the focus quality of said training image could be manually annotated scale values indicating a degree of a digital image being "in-focus." The color separation scores assigned to each of the training images and known to accurately indicate the color separation quality of said training image could likewise be manually annotated scale values indicating a degree of a digital image being capable of correctly determining if two dots have the same or different colors and thus may be indicative of different biomarkers. In sum, a plurality of candidate focus metrics and candidate color separation metrics may be computed and evaluated automatically and may be correlated with metrics acting as "training" or "ground true" metrics.

According to embodiments, the method further comprises:

obtaining a plurality of training z-layers in a z-stack of training digital images, each training digital image being an RGB image having assigned a color separation score known to accurately indicate the color separation quality of the training image;

for each of the training digital images computing a plurality of candidate color separation metrics, the plurality of candidate color separation metrics comprising metrics being incapable of indicating color separation quality and comprising metrics indicating color separation quality;

for each of the candidate color separation metrics, generating a plot 902 comprising an x-axis and a first and a second y-axis, the x-axis representing the z-axis of the z-stack of training images, the first y-axis representing units of the color separation scores assigned to the training images, the second y-axis representing units of the candidate color separation metrics, the plot generation comprising plotting the color separation quality scores assigned to the training images over the x-axis and the first y-axis and plotting the computed candidate color separation metrics computed for the training images over the x-axis and the second y-axis;

selectively using the candidate color separation metrics whose change across the z-layers correlates with the change of the color separation scores assigned to the training images across the z-layers for computing the color separation metrics for the single tissue sample.

A candidate color separation metrics is indicative of a property of a digital image that is suspected of having predictive power in respect to whether a blob of pixels has a first or a second color. A candidate color separation metrics may comprise one or more numerical or other data values that are computed by one or more image analysis operations from a digital image. A color separation metrics has alone or in combination with other color separation metrics predictive power in respect to whether a blob of pixels has a first or a second color.

Analogously, a candidate focus metrics is indicative of a property of a digital image that is suspected of having predictive power in respect to whether an image is in-focus. A candidate focus metrics comprises one or more numerical or other data values that are computed by one or more image analysis operations from a digital image. A focus metrics has alone or in combination with other focus features predictive power in respect to whether an image is in-focus, i.e., the focus quality of an image.

According to embodiments, the method further comprises:

obtaining a plurality of training z-layers in a z-stack of training digital images, each training digital image being an RGB image having assigned a focus score known to accurately indicate the focus quality of the training image;

for each of the training digital images computing a plurality of candidate focus metrics, the plurality of candidate focus metrics comprising metrics being incapable of indicating focus quality and comprising metrics indicating focus quality;

for each of the candidate focus metrics, generating a plot comprising an x-axis and a first and a second y-axis, the x-axis representing the z-axis of the z-stack of training images, the first y-axis representing units of the focus scores assigned to the training images, the second y-axis representing units of the candidate focus feature, the plot generation comprising plotting the focus quality scores assigned to the training images over the x-axis and the first y-axis and plotting the computed candidate focus metrics computed for the training images over the x-axis and the second y-axis; and selectively using the candidate focus features whose change across the z-layers correlates with the change of the focus scores assigned to the training images across the z-layers for computing the focus metrics for the single tissue sample. For example, in case a pair of Gaussian filters with a particular standard deviation have been identified (by computing a difference-of-Gaussian image from said pair of filters and determining that the change in DoG values correlate with the change in a ground truth metrics obtained from training images) as parameters having high predictive power in respect to color separation while another pair of Gaussian filters with another standard deviation have been identified as parameters having no predictive power in respect to the color separation, only the first DoG filter pair will be used for computing the color separation metrics on the test images (i.e., the z-stack of digital images depicting the single tissue sample on the slide). Metrics vectors of parameters having no predictive power in respect to the color separation will show a change in value from z-layer to the next (the "vector slope") which does not or not very well correlate with the change in value of a vector of ground truth score or color separation metrics obtained from training images of other tissue samples having been treated basically in the same manner as the single tissue sample used for generating the z-stack of test images.

According to embodiments, the determining of the one of the z-layers to be used for computing tissue-related or cell-related scores is performed while a process of scanning a slide comprising the tissues sample for generating the z-stack of images of said tissue sample is in progress. Thus, the z-layer identification may be performed in real time because the metrics not being based on dot-specific features can be computed very fast. For example, the identified z-layer can be the layer that is displayed as a control image during the scanning process, i.e. during the process of a scan apparatus moving over the slide and generating the image pixel-line by pixel-line.

According to embodiments, the method further comprises:

identifying a plurality of tiles in the z-stack of digital images of the single tissue sample, each tile comprising, for each of the z-layers, a sub region of the image;

for each of the tiles and for each of the z-layers, computing a plurality of tile focus metrics, each tile focus metric being an indicator of focus quality of the sub region of the digital image of said z-layer within said tile and being derived from image data of said sub region;

for each of the tiles and for each of the z-layers, computing a plurality of tile color separation metrics, each tile color separation metric being an indicator of color separation quality of the sub region of the digital image of said z-layer within said tile and being derived from image data of said sub region;

evaluating the tile focus metrics and the tile color separation metrics of all the tiles and selecting a sub-set of the tiles in dependence on the tile focus metrics and tile color separation metrics of the tiles; and selectively using the sub-set of the tiles for additional automated image analysis operations and/or highlighting the sub-set of the tiles in a graphical user interface.

This may be advantageous as a fine-grained tile structure and tile-specific focus and color separation scores may allow to selectively display and/or further process the ones of the tiles having high color separation scores and high focus scores.

A tile focus metrics is also referred herein as focus feature or focus metric computed for a tile from image data covered by said tile. A tile color separation metrics is also referred herein as color separation feature or color separation metrics computed for a tile from image data covered by said tile. A tile as used herein is a sub region of a digital image. A tile may have any shape, e.g. a circle, a square or a rectangle. The tiles of an image may be disjoint or overlapping.

In a further aspect, the disclosure relates to an image analysis method for selecting tiles in a multi-layered, z-stack of digital images. The z-stack of digital images depict different layers of a single tissue sample located on a slide. The z-stack images have been acquired by varying the focus of an optical sensor, e.g. the sensor of a slide scanning system. The method comprises:

identifying a plurality of tiles in the z-stack of digital images of the single tissue sample, each tile comprising, for each of the z-layers, a sub region of the image;

for each of the tiles and for each of the z-layers, computing a plurality of tile focus metrics, each tile focus metric being an indicator of focus quality of the sub region of the digital image of said z-layer within said tile and being derived from image data of said sub region;

for each of the tiles and for each of the z-layers, computing a plurality of tile color separation metrics, each tile color separation metric being an indicator of color separation quality of the sub region of the digital image of said z-layer within said tile and being derived from image data of said sub region;

evaluating the tile focus metrics and the tile color separation metrics of all the tiles and selecting a sub-set of the tiles in dependence on the tile focus metrics and tile color separation metrics of the tiles; and selectively using the sub-set of the tiles for additional automated image analysis operations and/or highlighting the sub-set of the tiles in a graphical user interface.

For example, the z-stack of digital images may be an already scanned image comprising multiple image layers obtained for different settings of the optical focus. The scanned image may e.g. be a 40000×40000 scan, at 40× resolution corresponding to pixels that are approximately 0.25 microns by 0.25 microns. In the following, embodiments of the invention will be described which may be likewise be performed on z-stacks of digital images which in which tiles may have been identified and on z-stacks of digital images where no tiles were identified. Only features explicitly relying on the presence of tiles are limited to embodiments comprising a tile identification.

According to embodiments, the tiles are disjoint squares, e.g. 320×240 pixel rectangles. In some embodiments, the time spent in computing the focus metric for such a tile is in the order of a few msec. This tile size is advantageous as it ensures that tile score computation for a 40000×40000 pixel scan, at 40× resolution, can be done in within 12-15 min on e.g. the Coreo scanner.

According to embodiments, the method further comprising automatically identifying a plurality of first dots and a plurality of second dots in each of the images of the z-stack of images, each dot being a blob of adjacent pixels, the pixel intensity values of the first dots correlating with an optical signal intensity of a first stain, the pixel intensity values of the second dots correlating with an optical signal intensity of a second stain, the first and second stain having been used for staining the single tissue sample and having different colors. A "dot" as used herein, that may also be considered as a small blob, is a set of adjacent pixels with similar optical features, e.g. whose intensity values lie above a threshold. A dot may be identified by a connected component analysis operation, e.g. intensity thresholding of an RGB image or the like.

According to embodiments, the method further comprises computing one or more of the tile focus metrics by:
  applying a plurality of pairs of Gaussian filters on each of the digital images of the z-layer of images, the kernels of the Gaussian filters having different standard deviations in each pair, for computing, for each of the z-layer images and for each of the pairs of Gaussian filters, a difference-of-Gaussian image,
  identifying, in each of the difference-of-Gaussian images, a plurality of DoG dots, a DoG dot being a set of adjacent pixels in a difference-of-Gaussian image whose pixel value exceeds a DoG threshold;
  computing, for each of the tiles and for all sub regions of z-stack images covered by said tile, an average-DoG-dot-value for all DoG dots identified in the difference-of-Gaussian image derived from said image sub-region, the average-DoG-dot value being indicative of the average DoG value of all pixels in the difference-of-Gaussian image contained in said DoG dot;
  computing, for each of the tiles and for all sub regions of z-stack images covered by said tile, the mean of all average-DoG-dot-values computed for said tile and using said mean of all average-DoG-dot-values as one of the tile focus metrics; and/or
  computing, for each of the tiles and for all sub regions of z-stack images covered by said tile, the median of all average-DoG-dot-values computed for said tile and using said median of all average-DoG-dot-values as one of the tile focus metrics; and/or
  sorting the average-DoG-dot-values computed for each of the tiles and for each of the z-layers of said tile and computing, for each of the tiles and for all sub regions of z-stack images covered by said tile, the mean of a predefined percentile value of the highest ranking ones of the sorted average-DoG-dot-values computed for said tile and using said mean of all average-DoG-dot-values as one of the tile focus metrics. For example, the percentile value may be 50%.

The pair of Gaussian filters is applied in order to perform a feature enhancement step. It involves the subtraction of one blurred version of an original image from another, less blurred version of the original. The blurred images are obtained by convolving an original image with two Gaussian filters whose kernels have differing standard deviations. Blurring an image using a Gaussian kernel suppresses only high-frequency spatial information. Subtracting one image from the other preserves spatial information that lies between the range of frequencies that are preserved in the two blurred images. Thus, the difference of Gaussians is a band-pass filter that discards all but a handful of spatial frequencies that are present in the original grayscale image. Preferentially, the standard deviation of the DoG filter is chosen such that dots having a size of 2-6 pixels and clusters of such dots will generate peaks in a DoG image.

For example, a first pair of Gaussian filters may have a first filter with a Kernel of one standard deviation and a second filter with a Kernel of two standard deviations. A second pair of Gaussian filters may have a first filter with a Kernel of two standard deviations and a second filter with a Kernel of three standard deviations. A third pair of Gaussian filters may have a first filter with a Kernel of three standard deviations and a second filter with a Kernel of four standard deviations. By applying all said pairs of Gaussian filters on each digital image of the z-stack, it is possible to identify the particular ones of the Gaussian filter pairs yielding particularly high DoG values in a difference-of-Gaussian image at image areas where dots are located. Preferentially, the size of the Kernels are adapted to the expected average size of the dots, e.g. are between 2 and 15 pixels in diameter.

According to embodiments, the method further comprising computing one or more of the tile focus metrics by:
  identifying, in each of the difference-of-Gaussian images, a plurality of first DoG dots, a first DoG dot being a set of adjacent pixels in a difference-of-Gaussian image whose pixel value exceeds a DoG threshold and which overlays one of the identified first dots;
  identifying, in each of the difference-of-Gaussian images, a plurality of second DoG dots, a second DoG dot being a set of adjacent pixels in a difference-of-Gaussian image whose pixel value exceeds a DoG threshold and which overlays one of the identified second dots;
  computing, for each of the tiles and for all sub regions of z-stack images covered by said tile, an average-first-DoG-dot-value for all first DoG dots identified in the difference-of-Gaussian image derived from said image sub-region, the average-first-DoG-dot value of a first DoG dot being indicative of the average DoG value of all pixels in the difference-of-Gaussian image contained in said first DoG dot;
  computing, for each of the tiles and for all sub regions of z-stack images covered by said tile, an average-second-DoG-dot-value for all second DoG dots identified in the difference-of-Gaussian image derived from said image sub-region, the average-second-DoG-dot value of a second DoG dot being indicative of the average DoG value of all pixels in the difference-of-Gaussian image contained in said second DoG dot;
  computing, for each of the tiles and for all sub regions of z-stack images covered by said tile, the mean of all average-first-DoG-dot-values computed for said tile and using said mean of all average-first-DoG-dot-values as one of the tile focus metrics; and/or
  computing, for each of the tiles and for all sub regions of z-stack images covered by said tile, the median of all average-second-DoG-dot-values computed for said tile and using said median of all average-second-DoG-dot-values as one of the tile focus metrics.

According to embodiments, the method further comprises computing one or more of the tile color separation metrics by:
  representing each of the identified first and second dots as a dot-vector in a color space;
  finding the spherical coordinates of the dot-vector of each of the first and second dots for identifying, for each of the first and second dots, an azimuth angle 972 and an elevation angle 974 of the dot-vector represented in spherical coordinates;

for each of the tiles and for each z-layer of said tiles, plotting the azimuth angles and elevation angles of all identified first and second dots contained in an azimuth-elevation plot 990;

fitting a first ellipse around all data points in the azimuth-elevation plot 990 having been derived from one of the first dots;

fitting a second ellipse around all data points in the azimuth-elevation plot 990 having been derived from one of the second dots;

computing the distance of the first and second ellipse; and using the computed distance as one of the tile color separation metrics, whereby the larger the distance between the first and second ellipse, the higher the color separation quality.

A corresponding example is depicted and explained for example in the description of FIG. 8.

According to embodiments, representing each of the identified first and second dots as a dot-vector in a color space comprises:

for each of the identified first and second dots, computing an $R_{DOTAVG}$ value, a $G_{DOTAVG}$-value and a $B_{DOTAVG}$ value, the $R_{DOTAVG}$ value being the average of the R component of all pixels contained in said dot, the $G_{DOTAVG}$ value being the average of the G component of all pixels contained in said dot, the $B_{DOTAVG}$ value being the average of the B component of all pixels contained in said dot, the RGB values being red, green, and blue pixel values in RGB color space;

for each of the identified first and second dots, computing an optical density vector RGBOD (920-934) comprising the elements $ROD_{DOTAVG}$, $GOD_{DOTAVG}$ and $BOD_{DOTAVG}$ computed for the dot according to:

$$ROD_{DOTAVG} = -\log(R_{DOTAVG}/BK), GOD_{DOTAVG} = -\log(G_{DOTAVG}/BK), BOD_{DOTAVG} = -\log(B_{DOTAVG}/BK),$$

Using the optical density vectors RGBOD as the dot-vector of the first and second dots.

According to embodiments, the tile color separation metrics comprises one or more of:

the maximum value (Amax) observed in all pixels of a dot whose RGB values are represented in a color channel, the color channel being a color channel in the LAB-color space whose color is the most similar to the color of the first or the second stain;

the maximum value (Asigmax) observed in all pixels of a dot whose RGB values are represented in a color channel derivative, the color channel derivative being computed as a derivative of a color channel in the LAB-color space whose color is the most similar to the color of the first or the second stain, the computation of the derivative color channel comprising applying a sigmoid function for removing extreme values;

For example, the color channel derivative ("Asig image") may be a derivative version of a LAB color channel, e.g. the A-channel of the digital image, generated by applying a sigmoid function on pixel values of the A-channel image. The Asig image is obtained by applying a sigmoidal function on said LAB-color channel image. Thereby, the A-channel intensity values are normalized to a value between 0 and 1. In other words, by applying the sigmoid function, the LAB-color-channel pixel values are nonlinearly transformed by the sigmoidal function, whereby the sigmoidal function limits the range of the output ("normalized" or "smoothed") intensity values to values between 0 and 1. The sigmoid function is, for example, almost linear near the mean color-channel pixel intensity value and has smooth nonlinearity at both extremes, ensuring that all ("Asig") pixel values output by the sigmoid function are within a limited range, whereby the influence of extreme values or outliers in the data is reduced. The idea is that there is some linear range where increases or decreases in the metric value can be considered "realistically" linear in the real world. At extreme values, a color channel pixel intensity may start to become asymptotically more meaningless. One might say that, for example, a value of 253 is really no different than a value of 254 and as such each would get transformed by the sigmoid function to some value near 1. Same could be said about color-channel intensity values in the range of 1-3 units which may be transformed by the sigmoid function to a value asymptotically close to 0.0. So the Asigmax of a dot is the maximum value (Asigmax) observed in all pixels of a dot in the Asig image.

the maximum color channel value observed in all pixels of a dot whose RGB values are represented in said color channel, the color channel having been generated by a color deconvolution of the RGB values into at least the first color of the first stain and the second color of the second stain, the color channel generated by the color deconvolution corresponding to the first or the second color;

a radial symmetry value indicating radial symmetry of the dot;

an average DoG value computed from the DoG values of all pixels of a dot, the DoG values of the dot being obtained from a difference-of-Gaussian image area in a difference-of-Gaussian image corresponding to the location of the pixels of said dot.

The radial symmetry value can be computed for example from votes of a gradient image derived from at least one image channel. Said image channel may be for example a luminance channel, an unmixed red channel, an A channel, an Asig channel, or a green channel; It is assumed that some dots generated by an optical signal of a first stain selectively bound to a first biomarker may be significantly more radial symmetric (on average) than dots generated by an optical signal of a second stain bound to another biomarker; thus, radial symmetry may be a metrics having predictive power in respect to the color of a dot; also the above mentioned color separation metrics are metrics having been observed to have predictive power in respect to the color (and thus, typically, to a particular biologic feature such as the presence or relative amounts of biomarkers) and thus can be used as color separation metrics.

According to embodiments, the method further comprising generating a heat map for the tiles, the heat map being indicative of the focus quality and/or of the color separation quality computed for each of the tiles, the highlighting of the sub-set of the tiles in a graphical user interface comprising displaying the computed heat map as an overlay of the tiles. A heat map is a graphical representation of data where the individual values contained are represented as colored pixels or colored regions, or in the case of monochrome, as pixels or regions of varying intensity. For example, the color of the heat map may indicate the focus score and/or the color separation score of an image.

According to embodiments, each tile has a width and height of 250-350 pixels, wherein preferentially 1 pixel corresponds to 0.23 μm of the tissue slide. Said size has been observed to be a good compromise of avoiding using too small tiles what could increase CPU consumption and of avoiding overly large tiles resulting in a loss of precision of the validity of tile-specific scores.

According to embodiments, a focus quality scores and a color separation quality score are computed only for those tiles having at least one first dot, each first dot corresponding to an in situ hybridization signal having a first color and at least one second dot, each second dot corresponding to an in situ hybridization signal having a second color. This may save CPU resources.

In a further aspect the disclosure relates to an image analysis system comprising one or more processors and a storage medium comprising computer-interpretable instructions which, when executed by the one or more processors, cause the one or more processors to perform a method according to any one of the embodiments of the invention described herein. The image analysis system can be, for example, a digital data processing device, e.g. a computer, comprising an interface for receiving image data from a slide scanner, a camera, a network and/or a storage medium.

In a further aspect the invention relates to a system comprising the image analysis system according to embodiments of the invention and comprising an optical slide scanning system. The slide-scanning system is configured for generating the z-stack of the digital images of the single biological sample. The instructions, when executed by the one or more processors, cause the one or more processors to perform the method according to embodiments of the invention for selecting the one of the z-layer image in real time for already generated parts of the z-stack of the digital images while the slide-scanning system scans the tissue slide.

In a further aspect the invention relates to a non-volatile storage medium comprising instructions which, when executed by a processor, cause the processor to perform the method of any one of the embodiments described herein.

Example 1

Dual ISH HER2

In general, to automatically score a breast tissue sample, candidate nuclei are selected for quantitative analysis. The computer system 14 automatically counts different features (e.g., HER2 genes, chromosome 17s, etc.) and determines the ratio of the number of features. A diagnosis can be made based, at least in part, on the ratios. To evaluate whether the tissue sample (e.g., breast tissue) is a carcinoma, the computer system 14 can assist the user in obtaining information about the selected region by, for example, detecting the amplification of genes by evaluating the ratio of the number of HER2 gene signals to the number of chromosome 17 signals.

When using the Ventana INFORM HER2 dual ISH assay, to determine a HER2/chromosome 17 ratio, the imaging apparatus 12 captures images that include silver in situ hybridization signals, red in situ hybridization signals, or the like. More, specifically, and with reference to FIG. 6, the HER2 gene is detected by a dinitrophenyl (DNP) labeled probe (A) and visualized utilizing VENTANA ultraView Silver ISH DNP (SISH) Detection (B). The chromosome 17 centromere is targeted with a digoxigenin (DIG) labeled probe (A) and detected using VENTANA ultraView Red ISH DIG Detection (C). Dual ISH staining utilizing this dual detection results in visualization via light microscopy in which HER2 appears as discrete black signals (SISH) and Chr17 as red signals (Red ISH).

The tissue is scored based on the signals corresponding to HER2 genes and chromosome 17s to determine the HER2/chromosome 17 ratio. Based on the ratio, the specimen's HER2 gene is determined to be amplified or not amplified. If the determined score is Score<=1.8=>Bin 1 (regarded as non-amplified or negative, from a score perspective); if the Score>1.8 and Score<=2.2=>Bin 2 (when the score is in this range, it is difficult to make a decision and 20 more cells are considered to decide amplified/non-amplified); and if the Score>2.2=>Bin 3 (regarded as amplified or positive).

Example 2

Description of Experimental Dataset and Correlation Metrics

For training the algorithm, i.e. to compute the correlation between the ground truth and computed features and to find the features more correlated to the ground truth, volume scans of 10 Dual ISH slides were used that were scanned at 40× using 15 z-layers at 0.25 micron spacing on the Coreo scanner. 76 Fields of View (FOVs) were extracted, resulting in 76*15=1140 images. For testing how well the correlation holds for unseen data, the testing set included volume scans of 12 Dual ISH slides, scanned at 40× using 15 z-layers and 0.25 micron separation; where 45 FOVs were extracted resulting in 45×15=675 images.

Suppose (a,b) (where derived image being considered=R+a*G+b*B, where (R,G,B) can be original 8-bit pixel values, or they can refer to the corresponding optical density values) are varied in the range [−1,1] in steps of 0.2; so each of a and b can take up 9 possible value and the set (a, b) can have 9×9=81 possible values. For the 1140 images in the z-stack based training set, the correlation between the proposed features (2nd pixel differences using R+a*G+b*B) with the GT scores was studied.

Each image was assigned a ground truth focus score and a ground truth red-vs-black separation score. The assigned focus score was in the range [0-2] where 2 indicated "very good focus" while a low score in the range [0-1] indicated very poor focus. For the red-vs-black separation, a score of [1-2] indicated poor red-vs-black discriminability, a score of [4-5] indicated much better red-vs-black discriminability, while a score of 3 indicated borderline red-vs-black discriminability.

Given a z-stack, ground truth focus and red-black scores were assigned to all the individual layers. If a feature was indicative of focus, then as the focus changed per layer, the feature should have increased/decreased as the focus term increased/decreased. Thus, the expectation was that the proposed focus feature would have been able to track the change in focus score across the different z-layers. A function of +1 was used when the feature and ground truth score (the feature and score can be in the context of focus, or in the context of red-vs-black separation) both increased or both decreased or are both very close to zero; −1 when the signs were different; and 0.5 when one of the feature changes was close to zero.

Example 3

Computation of Correlation score (C) Between a Quality Score Feature Vector (F), and a Ground Truth Score Vector (G). The following steps may be performed for a plurality of quality score feature vectors, whereby a quality score feature vector may be a vector of candidate color separation metrics computed for each of the z-layer images or may be a vector of candidate focus metrics computed for each of the z-layer images. For example, the correlation may be computed by using a plot 902 as depicted in FIG. 9 for a candidate focus feature metrics.

A plurality of training z-layers in a z-stack of training digital images is read by a processor of the computer system. Each training digital image is an RGB image having assigned a focus score known to accurately indicate the focus quality of the training image. For each of the training digital images, the processor computes a plurality of candidate focus metrics. It is at this stage not yet clear if a candidate focus metric has any predictive power in respect to focus quality as the plurality of candidate focus metrics may comprise a mixture of metrics being incapable of indicating focus quality and metrics capable of indicating focus quality. For each of the candidate focus metrics, the processor generates a plot 902 comprising an x-axis and a first and a second y-axis, the x-axis representing the z-axis of the z-stack of training images, the first y-axis representing units of the focus scores assigned to the training images, the second y-axis representing units of the candidate focus metrics. In the case of the candidate color separation metrics (not shown) the first y-axis would relate to a ground truth value of the color separation metrics used as the candidate color separation metrics and the second y-axis would represent the candidate color separation metrics. The plot generation comprises plotting the ground truth score vector G (in the example of FIG. 9: the focus quality scores 904 assigned to the training images) over the x-axis and the first y-axis and plotting the quality score feature vector F (in the example of FIG. 9: the candidate focus metrics 906 computed for the training images) over the x-axis and the second y-axis.

Then, the candidate focus metrics whose change across the z-layers correlate with the change of the focus scores assigned to the training images across the z-layers are selectively used, in a later application of the method on the z-stack of digital images (which may act as "test image," not as a "training image") for computing the focus metrics.

It was assumed that both F and G were vectors with N elements. N may indicate the number of layers in the z-stack of images, e.g. 15. A normalized difference vector DF is computed from vector F and a normalized difference vector DG is computed from vector G. The 1-D normalized difference was computed for both vectors DF and DG, both with (N-1) elements; where, $DF(n)=\{F(n+1)-F(n)\}/\{0.0001+F(n)\}$; $DG(n)=\{G(n+1)-G(n)\}/\{0.0001+G(n)\}$; $1<=n<N$. These normalized difference terms reflected the slope of the vectors, and when the slope term was less than a (in our experiments, a was set to 0.0005) in magnitude, it was regarded as 0.

The correlation score C was computed as:
$C=\{\Sigma i\ f(DF(i), DG(i))\}/(N-1)$, $1<=i<N$; where the function $f(.,.)$ is defined such that:

$f(x,y)=+1$, when x and y are both $>\alpha$, or both $<-\alpha$, or both magnitudes were within $|\alpha|$ $f(x,y)=-1$, when one of them (x,y) exceeds $\alpha$, and the other was less than $-\alpha$ $f(x,y)=0.5$, when one of them (x,y) was within $|\alpha|$ and the other exceeds $|\alpha|$ and was of a different sign. The parameter $|\alpha|$ is a minimum slope change threshold that may be used for identifying a very low change in slope of at least one of the normalized vectors DG or DF from one z-layer to another.

Thus, when the slopes of the 2 vectors F and G were similar, the correlation score between the 1-D normalized difference vectors, DF and DG, was close to +1. In this case, a respective metrics may be considered as having good predictive power in respect to focus or color separation.

Example 4

FIG. 10a depicts the representation of 6 dots of a first color and 6 dots of a second color in an optical density domain coordinate system. For example, a set of 6 vectors 918 corresponds to a set of 6 dots generated by black color signals of respective tissue sample areas stained with a black stain such as silver. A set of 6 vectors 936 corresponds to a set of 6 dots generated by red color signals of respective tissue sample areas stained with a red stain, e.g. a red fluorescent stain.

At first, the optical density (OD) of the rgb values for the 12 identified dots are determined. For example, the 12 dots may all be contained in the same tile.

Each of the identified first dots (e.g. black dots) and second dots (e.g. red dots) are represented as dot-vectors. The number 918 refers to the set of dot vectors derived from black dots and 936 refers to the set of dot vectors derived from red dots.

The 12 dot vectors are represented in spherical coordinates and the azimuth and elevation are identified.

FIGS. 10b and 10c depict a projection of the 12 dot vectors into the unit sphere 970, 980 for illustrating the identification of the azimuth angle 972 and the elevation angle 974 for each of the first and second dots. The azimuth angle 972 and the elevation angle 974 of each dot are derived from the spherical coordinates of a corresponding dot vector. For each of the tiles and for each z-layer of said tiles, the azimuth angles and elevation angles of all identified first and second dots are plotted in an azimuth-elevation plot 990 as shown in FIG. 11. The data points 918' in the plot 990 correspond to the dot vectors of the black dots and the data points 936' in the plot 990 correspond to the dot vectors of the red dots. Then, optionally, a data point classification step may be performed for classifying the data points in the plot 990 into a first class of data points derived from dots having a first color (e.g. black) and into a second class of data points derived from dots having a second color (e.g. black). It may also be the case that the first and second classes of dots have been classified previously or that the subsequent ellipse fitting operation is part of a classification procedure that groups data points in the azimuth-elevation plot into different classes based on the respective azimuth and elevation angles.

The processor fits a first ellipse around all data points in the azimuth-elevation plot 990 having been derived from one of the first dots and fits a second ellipse around all data points in the azimuth-elevation plot 990 having been derived from one of the second dots as described also in more detail for FIG. 7a.

Ellipse Fitting to Red and Black Dots

Ellipses were fitted to the RGB optical density (OD) values of the pixels identified as red or black, after dots were found. Ellipse fitting is visually shown, for example, in FIG. 7A.

The RGB-OD vector:
$RGBOD(i)=log(BK/RGB(i))$, where background color $BK=240$, $i=1, 2, 3$ (i denoted the i th color channel).

The RGB-OD vector was projected to the unit sphere and the abscissa was azimuthal angle ($\phi$) and the ordinate was elevation angle ($\theta$). The relation between Cartesian (x, y, z) and spherical (r, $\theta$, $\phi$) coordinates is as follows: $x=r\cdot\sin(\theta)\cdot\cos(\phi)$; $y=r\cdot\sin(\theta)\cdot\sin(\phi)$; $z=r\cdot\cos(\theta)$.

Best features for red-black quality were "yMu(2)" and "dMu," "where "yMu(2)" is the mean elevation of the OD vector for the red pixels and "dMu" is the Euclidean distance between the center of the red pixels and the center of the black pixels in the elevation-azimuth plot. It was determined that the farther apart the red and black pixel clusters were, the larger dMu became. This was demonstrated in FIGS. 7A and 7B, where FIG. 7B show the cell image where the red and black dot pixels have been identified, and based on them, the ellipse plot for the red and black dots have been computed, as shown in FIG. 7A. Two representative pixels were: Black RGB=108, 114, 150; Red RGB=177, 123, 178; RGBOD, black: 0.84, 0.78, 0.51; RGBOD, red: 0.35, 0.71, 0.34; Elev-azim, black: 0.74, 0.42; Elev-azim, red: 1.04, 0.41.

Example 5

Superior Results of New Focus Method Compared to the Prior Art 227 z-stacks were obtained using 15 layers per tile, and using 0.25 micron spacing, performed on the Coreo scanner. A range of layers were "ground truthed" and marked corresponding to "very good quality scoreable layers" for the given z-stack. The expectation from a scoring metric was that when a best layer was computed algorithmically, then that best layer should belong to the set of "very good quality scoreable layers," which were identified visually. The best layer was determined using the old focus method (using sum of squared difference based cost computed on Green channel) and also using the new method and the results were compared.

Based on the data collected from 227 z-stacks, it was observed that the best z-layer (as indicated from ground truthing) was captured accurately in 187 cases using the new focus method and in only 140 cases using the old focus method. Thus, new focus metrics have been identified, which are fast to compute, and which return the best z-layer in a significantly higher number of cases as compared to the old focus method. Therefore, the new method provides superior and unexpected results as compared with that known in the art.

Example 6

(a) Features derived from mean and standard deviation for ellipses fitted to differently colored dots (e.g. black and red colored dots)

Features: xmu1, xmu2, ymu1, ymu2, xsig1, xsig2, ysig1, ysig2. Considering ellipses plotted for black dot pixels, the center obtained (xmu1, ymu1) where the 2D axis used was x axis=azimuthal coordinate from OD space and y axis=elevation angle obtained from OD space. Similarly, from red dot pixels, the center computed=(xmu2, ymu2).

The standard deviation along the x-axis (azimuthal coordinate) for black pixels and red pixels was given by xsig1 and xsig2, respectively. The standard deviation along the y-axis (elevation angle) for black pixels and red pixels was given by ysig1 and ysig2, respectively.

(b) Features derived from the distance between differently colored ellipses (e.g. distance between black and red color ellipses, i.e., distance between an ellipse fitted to azimuth-elevation plot data points derived from black dots and an ellipse fitted to azimuth-elevation plot data points derived from red dots): dmu, dmunorm $$dmu=\text{sqrt}(dxmu^2+dymu^2);$$

$$dxmu=(xmu1-xmu2); dymu=(ymu1-ymu2);$$

$$dmunorm=\text{sqrt}(termx1*termx1+termx2*termx2)+\\(termy1*termy1+termy2*termy2))$$

where:

$$termx1=(xmu1-(xmu1+xmu2)/2)/(0.0001+xsig1)$$

$$termx2=(xmu2-(xmu1+xmu2)/2)/(0.0001+xsig2)$$

$$termy1=(ymu1-(ymu1+ymu2)/2)/(0.0001+ysig1)$$

$$termy2=(ymu2-(ymu1+ymu2)/2)/(0.0001+ysig2)$$

Thus, dMu was the Euclidean distance between the center of the red pixels and the center of the black pixels in the elevation-azimuthal plot. So, the farther apart the red and black pixel clusters were, the larger dMu became. The 0.0001 term is incorporated in the division to avoid division by zero. Alternatively, any other value larger than zero and preferentially smaller than 0.001 could be used.

(c) Features derived from the dimensions of color ellipses: semiaxes of major axis 1, minor axis 1, major axis 2, and minor axis 2

Considering the black pixels, an ellipse was obtained and its dimensions were given by (major axis 1, minor axis 1). Considering the red pixels, an ellipse was obtained and its dimensions were given by (major axis 2, minor axis 2).

Each of said features may be used for computing a color separation metrics for a particular tile.

Example 7

Method to Select "Top N Good Quality" Regions Given Quality Scores for Every Tile This example assumed that there were M tiles in a whole slide scan. It also assumed that the focus score and color separated score were computed and that the differently colored pixels were counted. This example considered red and black dot pixels and a color separation between the red and black dot pixels.

For the i-th tile, the focus score was F(i), the red-black-separation score was RB(i), and number of black and red dot pixels were B(i) and R(i), respectively.

A reference value of the focus score was FC (computed empirically based on the data where we have computed focus scores for a large number of good-quality and poor-quality tiles) and a reference value of the red versus black separation score was RBC (computed empirically based on the data where we have computed red-vs-black separation scores for a large number of good-quality and poor-quality tiles).

For the i-th tile, normalized focus score NF(i)=F(i)/FC; For the i-th tile, normalized red-vs-black separation score NRB(i)=RB(i)/RBC. For the i-th tile, the minimum of the normalized focus and normalized red-vs-black separation scores MINscore(i)=min(NF(i), NRB (i)).

The minimum number of black dot pixels expected per tile was set as min_blacks, and the minimum number of red dot pixels expected per tile was set as min_reds.

Only those tiles considered as valid tiles were those which had a certain minimum number of red tiles and black tiles.

The set of valid tiles, V, out of all M tiles, was:

$$V=\{i:B(i)>\text{min\_blacks and } R(i)>\text{min\_reds;}\\1<=i<=M\}$$

The black-to-red ratio (the number of black dot pixels divided by the number of red dot pixels) per tile was computed for all the valid tiles. For the k-th valid tile, the ratio term was RATIO(k)=B(V(k))/R(V(k)).

Ratio_sort was set as the sorted version of RATIO, which was sorted in descending order.

Ratio_sorted_cutoff was set as Ratio_sort(round(0.4*|Ratio_sort|)); where |Ratio_sort| denoted the number of elements in the set Ratio_sort.

The top 40% of these tiles were taken and marked as valid tiles (Vnew).

$$Vnew=\{V(k):\text{Ratio\_sort}(k)>\text{ratio\_sorted\_cutoff},$$
$$1<=k<=|\text{Ratio\_sort}|\}$$

The tiles in this set Vnew were then sorted based on MINscore.

MINscore_sorted=sort({MINscore(Vnew(k)); 1<=k<=|Vnew|}), in descending order.

The corresponding indices in sorted order was set as indices_sorted.

Therefore, the 1st tile index after sorting MINscore (Vnew) in descending order=Vnew(indices_sorted(1)).

To return the top 10% of tiles in Vnew (or 50 tiles, whichever is higher), then let N=max(round(0.1*|Vnew|), 50).

Then the set of tiles returned ST is:

$$ST(k)=Vnew(\text{indices\_sorted}(k)); 1<=k<=N$$

Thus, it was ensured that the top N regions were selected, which had at least a minimum of black dot pixels and a minimum of red dot pixels; and these regions were also high in focus score, and also in red-vs-black separation score. By selecting those tiles which had higher value of MINscore, it was ensured that those tiles were selected which were not very low with regard to focus, or very low with regard to red-vs-black separation. The intuition here was that visually, a tile with moderate quality with regard to focus and red-vs-black separation was believed to have been preferable over a tile which was of "high focus but low red-vs-black separation," or of "high red-vs-black separation but of very poor focus."

Additional Embodiments

1. An image analysis method for determining one of a plurality of z-layers in a z-stack of digital images to be used for computing tissue-related or cell-related scores, the z-stack of digital images depicting different layers of a single tissue sample located on a slide, the z-stack images having been acquired by varying the focus of an optical sensor, the method being implemented in an image analysis system and comprising: for each of the z-layers, computing focus metrics, each focus metric being an indicator of focus quality of the z-layer and being derived from image data of said z-layer; for each of the z-layers, computing color separation metrics, each color separation metric being an indicator of color separation quality of the z-layer and being derived from image data of said z-layer; and evaluating the focus metrics and the color separation metrics and determining the one of the z-layers to be used for computing tissue-related or cell-related scores in dependence on the focus metrics and color separation metrics of each of the z-layers.

2. The image analysis method of embodiment 1, further comprising: analyzing selectively the one of the images in the z-stack of digital images that corresponds to the determined z-layer and selectively computing the tissue-related or cell-related scores for said analyzed image.

3. The image analysis method of any one of the previous embodiments, wherein the evaluation of the focus metrics and the color separation metrics comprises: computing the difference between the z-layer having best focus and the z-layer having best color separation by computing an absolute value of the difference of the index position of the z-layer having best focus and the index position of the z-layer having best color separation in the z-stack; determining whether the computed difference is greater than, equal to, or less than a predetermined threshold value; in case the computed difference is determined to be less than or equal to the predetermined threshold value: computing an average of the z-layer index of the z-layer having best focus and the z-layer index of the z-layer having best color separation; if the average of the z-layer index is an integer, identifying the one of the z-layers of the z-stack whose index position is identical to the computed average of the z-layer indices; if the average of the z-layer index is not an integer, identifying the two consecutive z-layers of the z-stack which lie next to the computed average of the z-layer indices and identifying the one of the two consecutive z-layers having the highest color separation metrics; and using said one identified z-layer as the one z-layer to be used for computing the scores; and in case the computed difference is determined to be greater than the predetermined threshold value: comparing a focus score derived from the focus metrics of the z-layer image having best focus with a reference focus score, the reference focus score being an empirically determined focus score obtained for a digital image depicting the same type of tissue sample and having been manually identified as being in-focus for determining a deviation of the focus score from the reference focus score; comparing a color separation score derived from the color separation metrics of the z-layer image having best color separation with a reference color separation score, the reference color separation score being an empirically determined color separation score obtained for a digital image depicting the same type of tissue sample and having been manually identified as being a high quality color separation image for determining a deviation of the color separation score from the reference color separation score; in case the deviation of the focus score from the reference focus score is greater than the deviation of the color separation score from the reference color separation score, using the z-layer image having best color separation for computing the scores.

4. The image analysis method of embodiment 3, further comprising: in case the deviation of the color separation score and the reference color separation score is greater than the deviation of the focus score and the reference focus score, using the z-layer image having best focus for computing the scores.

5. The image analysis method of any one of the previous embodiments, further comprising: computing, for each of the z-layers, a focus score by using the focus metrics of the digital image corresponding to the z-layer as input; computing, for each of the z-layers, a color separation score by using the color separation metrics of the digital image corresponding to the z-layer as input; identifying the z-layer having best focus and identifying the z-layer having best color separation.

6. The image analysis method of embodiment 5, the identification of the z-layer having best focus comprising: storing the focus score of each of the z-layers in a respective element of a focus score vector; vector element-wise moving a smoothing-window across the focus score vector, whereby at each moving step of the smoothing window, an average or median of the focus scores in the focus score vector elements covered by the smoothing window are computed; generating a smoothed focus score vector whose elements comprise the averaged or median focus scores instead of the original focus scores of the focus vector; identifying the one of the z-layers that corresponds to the element in the smoothed focus score vector comprising the maximum focus score value as the z-layer having highest focus score.

7. The image analysis method of embodiment 5 or 6, the identification of the z-layer having best color separation comprising: storing the color separation score of each of the z-layers in a respective element of a color separation score vector; vector element-wise moving a smoothing-window across the color separation vector, whereby at each moving step of the smoothing window, an average or median of the color separation scores in the color separation score vector elements covered by the smoothing window are computed; generating a smoothed color separation score vector whose elements comprise the averaged or median color separation scores instead of the original color separation scores of the color separation vector; identifying the one of the z-layers that corresponds to the element in the smoothed color separation score vector comprising the maximum color separation score value as the z-layer having highest color separation score.

8. The image analysis method of anyone of the previous embodiments, the tissue sample having been stained at least with a first stain having a first color and a second stain having a second color, the first and second colors differing from each other, the color separation metric being an indicator of color separation quality of the first and the second color.

9. The image analysis method of anyone of the previous embodiments, each of the digital images being an RGB image, the computation of the color separation metrics comprising, for each of the digital images: computing a derivative image from the digital RGB image by computing a first derivative value DER1 for each of the pixels in the digital RGB image according to $DER1=R+a_{CS}*G+b_{CS}*B$, where $-1 \le a_{CS} \le 1$, where $-1 \le b_{CS} \le 1$, wherein R, G and B are the red, green and blue components of the pixel intensity of said pixel in the RGB image, wherein $a_{CS}$ and $b_{CS}$ are parameter values having been empirically determined as values which, when used for computing color separation metrics, provide color separation metrics having predictive power in respect to color separation quality of an image; computing a color separation metric $J_{CS}$ according to the formula $J_{CS}=\Sigma_x \Sigma_y (|DER1(x,y)-DER1(x,y-s)|^2)$, wherein x and y are the x and y coordinates of the pixels in the derivative image and s is a number of pixel distance positions, whereby s has been empirically determined as pixel distance positions that correlate with high $J_{CS}$ values in images of known, high color separation quality.

10. The image analysis method of embodiments 9, further comprising empirically determining the parameters $a_{CS}$ and $b_{CS}$ by: obtaining a plurality of different candidate a-values and candidate b-values for $a_{CS}$ and $b_{CS}$, each candidate a-value and each candidate b-value lying in the range [-1; +1]; obtaining a plurality of training z-layers in a z-stack of training digital images, each training digital image being an RGB image having assigned a color separation score known to accurately indicate the color separation quality of the training image; for each possible combination of a candidate a-value and a candidate b-value, and for each of the training images in the training z-stack, computing a derivative image according to the formula $DER1_{acand-bcand}=R+a_{CS-cand}*G+b_{CS-cand}*B$, wherein R, G and B are the red, green and blue components of the pixel intensity of said pixel in the RGB training image, wherein $a_{CS-cand}$ and $b_{CS-cand}$ are one of the possible combinations of a candidate a-value and a candidate b value, and wherein $DER1_{acand-bcand}$ is the first derivative value computed for each pixel in the derivative image by using said one combination of candidate a- and b-values; for each of said computed derivative images, computing a color separation metric $J_{CS.acand-bacand}$ according to the formula $J_{CS.acand-bcand}=\Sigma_x \Sigma_y (|DER1_{acand-bacand}(x,y)-DER1_{acand-bacand}(x,y-s)|^2)$, wherein x and y are the x and y coordinates of the pixels in the derivative image computed for one of the training images and for one combination of an a-candidate value and a b-candidate value, and s is a number of pixel distance positions, whereby s has been empirically determined as pixel distance positions that correlate with high $J_{CS}$ values in images of known, high color separation quality; identifying the combination of candidate a- and b-values that correlate best with the color separation scores assigned to each of the training images and known to accurately indicate the color separation quality of said training image; and using the identified candidate a- and candidate b values as the parameter values $a_{CS}$, $b_{CS}$ having been empirically determined.

11. The image analysis method of anyone of the previous embodiments, each of the digital images being an RGB image, the computation of the focus metrics comprising, for each of the digital images: computing an optical-density-domain image from the digital RGB image by computing a ROD, a GOD and a BOD value for each pixel of the RGB image according to: $ROD=-\log(R/BK)$, $GOD=-\log(G/BK)$, $BOD=-\log(B/BK)$, wherein R, G and B are the red, green and blue components of the pixel intensity of said pixel in the RGB image, wherein BK is a background intensity value typical for tissue slide glass; computing a derivative image from the optical domain image by computing a second derivative value DER2 for each of the pixels in the optical-density-domain image according to $DER2=ROD+a_F*GOD+b_F*BOD$, where $-1 \le a_F \le 1$, where $-1 \le b_F \le 1$, wherein $a_F$ and $b_F$ are parameters having been empirically determined as values which, when used for computing focus metrics, provide focus metrics having predictive power in respect to whether an image is in-focus; computing a focus metric $J_F$ according to the formula $J_F=\Sigma_x \Sigma_y (|DER2(x,y)-DER2(x,y-s)|^2)$, wherein x and y are the x and y coordinates of the pixels in the derivative image and s is a number of pixel distance positions, whereby s has been empirically determined as pixel distance positions that correlate with high $J_F$ values in images known to be in-focus.

12. The image analysis method of embodiment 11, further comprising empirically determining the parameters $a_F$ and $b_F$ by: obtaining a plurality of different candidate a-values and candidate b-values for $a_F$ and $b_F$, each candidate a-value and each candidate b-value lying in the range [-1; +1]; obtaining a plurality of training z-layers in a z-stack of training digital images, each training digital image being an RGB image having assigned a focus score known to accurately indicate whether the training image is in-focus; computing a training optical-density-domain image for each of the training images by computing a ROD, a GOD and a BOD value for each pixel of the training image; for each possible combination of a candidate a-value and a candidate b-value, and for each of the training optical-density-domain images in the training z-stack, computing a derivative image according to the formula $DER2_{acand-bcand}=ROD+a_{F-cand}*GOD+b_{F-cand}*BOD$, wherein ROD, GOD and BOD respectively are components of a pixel in the training optical-density-domain image, wherein $a_{F-cand}$ and $b_{F-cand}$ are one of the possible combinations of a candidate a-value and a candidate b-value and wherein DER2acand-bcand is the second derivative value computed for each pixel in the derivative image by using said one combination of candidate a- and b-values; for each of said computed derivative images, computing a focus metric $J_{F.acand\text{-}bacand}$ according to the formula $J_{F.acand\text{-}bcand} = \Sigma_x \Sigma_y (|DER2_{acand\text{-}bacand}(x,y) - DER2_{acand\text{-}bacand}(x,y-s)|^2)$, wherein x and y are the x and y coordinates of the pixels in the derivative image computed for one of the training images and for one combination of an a-candidate value and a b-candidate value, and s is a number of pixel distance positions, whereby s has been empirically determined as pixel distance positions that correlate with high $J_F$ values in images of known focus quality; identifying the combination of candidate $a_{F\text{-}cand}$ and $b_{F\text{-}cand}$-values that correlate best with the focus scores assigned to each of the training images and known to accurately indicate the focus quality of said training image; and using the identified candidate $a_{F\text{-}cand}$—and candidate $b_{F\text{-}cand}$ values as the parameter values $a_F$, $b_F$ having been empirically determined.

13. The image analysis method of any one of the previous embodiments, further comprising: obtaining a plurality of training z-layers in a z-stack of training digital images, each training digital image being an RGB image having assigned a color separation score known to accurately indicate the color separation quality of the training image; for each of the training digital images computing a plurality of candidate color separation metrics, the plurality of candidate color separation metrics comprising metrics being incapable of indicating color separation quality and comprising metrics indicating color separation quality; for each of the candidate color separation metrics, generating a plot (902) comprising an x-axis and a first and a second y-axis, the x-axis representing the z-axis of the z-stack of training images, the first y-axis representing units of the color separation scores assigned to the training images, the second y-axis representing units of the candidate color separation metrics, the plot generation comprising plotting the color separation quality scores assigned to the training images over the x-axis and the first y-axis and plotting the computed candidate color separation metrics computed for the training images over the x-axis and the second y-axis; selectively using the candidate color separation metrics whose change across the z-layers correlates with the change of the color separation scores assigned to the training images across the z-layers for computing the color separation metrics for the single tissue sample.

14. The image analysis method of any one of the previous embodiments, further comprising: obtaining a plurality of training z-layers in a z-stack of training digital images, each training digital image being an RGB image having assigned a focus score known to accurately indicate the focus quality of the training image; for each of the training digital images computing a plurality of candidate focus metrics, the plurality of candidate focus metrics comprising metrics being incapable of indicating focus quality and comprising metrics indicating focus quality; for each of the candidate focus metrics, generating a plot (902) comprising an x-axis and a first and a second y-axis, the x-axis representing the z-axis of the z-stack of training images, the first y-axis representing units of the focus scores assigned to the training images, the second y-axis representing units of the candidate focus metrics, the plot generation comprising plotting the focus quality scores (904) assigned to the training images over the x-axis and the first y-axis and plotting the candidate focus metrics (906) computed for the training images over the x-axis and the second y-axis; selectively using the candidate focus metrics whose change across the z-layers correlates with the change of the focus scores assigned to the training images across the z-layers for computing the focus metrics for the single tissue sample.

15. The image analysis method of anyone of the previous embodiments, the determining of the one of the z-layers to be used for computing tissue-related or cell-related scores being performed while a process of scanning a slide comprising the tissues sample for generating the z-stack of images of said tissue sample is in progress.

16. The image analysis method according to any one of the previous embodiments, the method comprising: identifying a plurality of tiles in the z-stack of digital images of the single tissue sample, each tile comprising, for each of the z-layers, a sub region of the image; for each of the tiles and for each of the z-layers, computing a plurality of tile focus metrics, each tile focus metric being an indicator of focus quality of the sub region of the digital image of said z-layer within said tile and being derived from image data of said sub region; for each of the tiles and for each of the z-layers, computing a plurality of tile color separation metrics, each tile color separation metric being an indicator of color separation quality of the sub region of the digital image of said z-layer within said tile and being derived from image data of said sub region; evaluating the tile focus metrics and the tile color separation metrics of all the tiles and selecting a sub-set of the tiles in dependence on the tile focus metrics and tile color separation metrics of the tiles; and selectively using the sub-set of the tiles for additional automated image analysis operations and/or highlighting the sub-set of the tiles in a graphical user interface.

17. The image analysis method of embodiment 16, the method further comprising: automatically identifying a plurality of first dots and a plurality of second dots in each of the images of the z-stack of images, each dot being a blob of adjacent pixels, the pixel intensity values of the first dots correlating with an optical signal intensity of a first stain, the pixel intensity values of the second dots correlating with an optical signal intensity of a second stain, the first and second stain having been used for staining the single tissue sample and having different colors.

18. The image analysis method of embodiment 17, the method further comprising computing one or more of the tile focus metrics by: applying a plurality of pairs of Gaussian filters on each of the digital images of the z-layer of images, the kernels of the Gaussian filters having different standard deviations in each pair, for computing, for each of the z-layer images and for each of the pairs of Gaussian filters, a difference-of-Gaussian image, identifying, in each of the difference-of-Gaussian images, a plurality of DoG dots, a DoG dot being a set of adjacent pixels in a difference-of-Gaussian image whose pixel value exceeds a DoG threshold; computing, for each of the tiles and for all sub regions of z-stack images covered by said tile, an average-DoG-dot-value for all DoG dots identified in the difference-of-Gaussian image derived from said image sub-region, the average-DoG-dot value being indicative of the average DoG value of all pixels in the difference-of-Gaussian image contained in said DoG dot; computing, for each of the tiles and for all sub regions of z-stack images covered by said tile, the mean of all average-DoG-dot-values computed for said tile and using said mean of all average-DoG-dot-values as one of the tile focus metrics; and/or computing, for each of the tiles and for all sub regions of z-stack images covered by said tile, the median of all average-DoG-dot-values computed for said tile and using said median of all average-DoG-dot-values as one of the tile focus metrics; and/or sorting the average-DoG-dot-values computed for each of the tiles and for each of the z-layers of said tile and computing, for each of the tiles and for all sub regions of z-stack images covered by said tile, the mean of a predefined percentile value of the highest ranking ones of the sorted average-DoG-dot-values computed for said tile and using said mean of all average-DoG-dot-values as one of the tile focus metrics.

19. The image analysis method of embodiment 18, the method further comprising computing one or more of the tile focus metrics by: identifying, in each of the difference-of-Gaussian images, a plurality of first DoG dots, a first DoG dot being a set of adjacent pixels in a difference-of-Gaussian image whose pixel value exceeds a DoG threshold and which overlays one of the identified first dots; identifying, in each of the difference-of-Gaussian images, a plurality of second DoG dots, a second DoG dot being a set of adjacent pixels in a difference-of-Gaussian image whose pixel value exceeds a DoG threshold and which overlays one of the identified second dots; computing, for each of the tiles and for all sub regions of z-stack images covered by said tile, an average-first-DoG-dot-value for all first DoG dots identified in the difference-of-Gaussian image derived from said image sub-region, the average-first-DoG-dot value of a first DoG dot being indicative of the average DoG value of all pixels in the difference-of-Gaussian image contained in said first DoG dot; computing, for each of the tiles and for all sub regions of z-stack images covered by said tile, an average-second-DoG-dot-value for all second DoG dots identified in the difference-of-Gaussian image derived from said image sub-region, the average-second-DoG-dot value of a second DoG dot being indicative of the average DoG value of all pixels in the difference-of-Gaussian image contained in said second DoG dot; computing, for each of the tiles and for all sub regions of z-stack images covered by said tile, the mean of all average-first-DoG-dot-values computed for said tile and using said mean of all average-first-DoG-dot-values as one of the tile focus metrics; and/or computing, for each of the tiles and for all sub regions of z-stack images covered by said tile, the median of all average-second-DoG-dot-values computed for said tile and using said median of all average-second-DoG-dot-values as one of the tile focus metrics.

20. The image analysis method of any one of embodiments 17-19, the method further comprising computing one or more of the tile color separation metrics by: representing each of the identified first and second dots as a dot-vector (920-934) in a color space (960); finding the spherical coordinates of the dot-vector of each of the first and second dots for identifying, for each of the first and second dots, an azimuth angle (972) and an elevation angle (974) of the dot-vector represented in spherical coordinates; for each of the tiles and for each z-layer of said tiles, plotting the azimuth angles and elevation angles of all identified first and second dots contained in an azimuth-elevation plot (990); fitting a first ellipse around all data points in the azimuth-elevation plot (990) having been derived from one of the first dots; fitting a second ellipse around all data points in the azimuth-elevation plot (990) having been derived from one of the second dots; computing the distance of the first and second ellipse; and using the computed distance as one of the tile color separation metrics, whereby the larger the distance between the first and second ellipse, the higher the color separation quality.

21. The image analysis method of embodiment 20, wherein representing each of the identified first and second dots as a dot-vector in a color space comprises: for each of the identified first and second dots, computing an $R_{DOTAVG}$ value, a $G_{DOTAVG}$-value and a $B_{DOTAVG}$ value, the $R_{DOTAVG}$ value being the average of the R component of all pixels contained in said dot, the $G_{DOTAVG}$ value being the average of the G component of all pixels contained in said dot, the $B_{DOTAVG}$ value being the average of the B component of all pixels contained in said dot, the RGB values being red green and blue pixel values in RGB color space; for each of the identified first and second dots, computing an optical density vector RGBOD (920-934) comprising the elements $ROD_{DOTAVG}$, $GOD_{DOTAVG}$ and $BOD_{DOTAVG}$ computed for the dot according to: $ROD_{DOTAVG}=-\log(R_{DOTAVG}/BK)$, $GOD_{DOTAVG}=-\log(G_{DOTAVG}/BK)$, $BOD_{DOTAVG}=-\log(B_{DOTAVG}/BK)$, Using the optical density vectors RGBOD as the dot-vector of the first and second dots.

22. The image analysis method of any one of embodiments 17-21, the tile color separation metrics further comprising one or more of: the maximum value (Amax) observed in all pixels of a dot whose RGB values are represented in a color channel, the color channel being a color channel in the LAB-color space whose color is the most similar to the color of the first or the second stain; the maximum value (Asigmax) observed in all pixels of a dot whose RGB values are represented in a color channel derivative, the color channel derivative being computed as a derivative of a color channel in the LAB-color space whose color is the most similar to the color of the first or the second stain, the computation of the derivative color channel comprising applying a sigmoid function for removing the effect of extreme values; the maximum color channel value observed in all pixels of a dot whose RGB values are represented in said color channel, the color channel having been generated by a color deconvolution of the RGB values into at least the first color of the first stain and the second color of the second stain, the color channel generated by the color deconvolution corresponding to the first or the second color; a radial symmetry value indicating radial symmetry of the dot; an average DoG value computed from the DoG values of all pixels of a dot, the DoG values of the Dot being obtained from a difference-of-Gaussian image area in a difference-of-Gaussian image corresponding to the location of the pixels of said dot.

23. The image analysis method of any one of embodiments 17-22, the method further comprising generating a heat map for the tiles, the heat map being indicative of the focus quality and/or of the color separation quality computed for each of the tiles, the highlighting of the sub-set of the tiles in a graphical user interface comprising displaying the computed heat map as an overlay of the tiles.

24. The image analysis method of any one of embodiments 17-23, each tile having a width and height of 250-350 pixels, wherein preferentially 1 pixel corresponds to 0.23 μm of the tissue slide.

25. The image analysis method of any one of embodiments 17-24, wherein a focus quality scores and a color separation quality score are computed only for those tiles having at least one first dot, each first dot corresponding to an in situ hybridization signal having a first color and at least one second dot, each second dot corresponding to an in situ hybridization signal having a second color.

26. An image analysis system comprising one or more processors and a storage medium comprising computer-interpretable instructions which, when executed by the one or more processors, cause the one or more processors to perform a method according to any one of embodiments 1-25.

27. A system comprising the image analysis system of any one of embodiments 1-16 and comprising an optical slide scanning system, the slide-scanning system being configured for generating the z-stack of the digital images of the single biological sample, the instructions, when executed by the one or more processors, cause the one or more processors to perform the method according to any one of embodiments 1-15 in real time for already generated parts of the z-stack of the digital images while the slide-scanning system scans the tissue slide.

28. A non-volatile storage medium comprising instructions which, when executed by a processor, cause the processor to perform the method of any one of embodiments 1-25.

29. A computer system for determining the most suitable z-layer in a given z-stack, comprising one or more processors and at least one memory, the at least one memory storing non-transitory computer-readable instructions for execution by the one or more processors to cause the one or more processors to: compute focus metrics and color separation metrics for each z-layer within a z-stack of images, each z-layer within the z-stack of images corresponding to an image of a tissue sample, and evaluate the focus metrics and color separation metrics to determine a most suitable z-layer within the z-stack.

30. The computer system of embodiment 29, wherein the focus metrics comprise a focus quality score for each z-layer, and wherein the color separation metrics comprise a color separation quality score for each z-layer.

31. The computer system of embodiment 30, wherein the focus quality score for each z-layer and the color separation quality score for each z-layer are independently computed within empirically determined color spaces optimized for signals of an in situ hybridization assay applied to the tissue sample.

32. The computer system of embodiment 30, wherein the evaluation of the focus metrics and color separation metrics comprises computing an absolute value metric and determining whether the absolute value metric is greater than, equal to, or less than a predetermined threshold value.

33. The computer system of embodiment 31, wherein the absolute value metric is an absolute value of the difference between the z-layer having best focus and the z-layer having best color separation.

34. The computer system of embodiment 33, wherein the z-layer having best focus and the z-layer having best color separation are each independently computed by median filtering the focus quality scores and color separation quality scores, respectively, and then identifying a maximum value for the median filtered focus quality scores and a maximum value for the median filtered color separation quality scores.

35. The computer system of embodiment 34, wherein if the absolute metric is determined to be less than or equal to the predetermined threshold value, instructions are provided to set the most suitable z-layer as a compromise layer metric, wherein the compromise layer metric is an average value of the z-layer having best focus and the z-layer having best color separation.

36. The computer system of embodiment 34, wherein if the absolute metric is determined to be greater than the predetermined threshold value, instructions are provided to evaluate whether the most suitable z-layer should be guided by focus features or color separation features.

37. The computer system of embodiment 36, wherein the evaluation of whether the most suitable z-layer should be guided by focus features or color separation features is determined by comparing a layer focus comparator value to a layer color separation comparator value, whereby if the layer focus comparator value is greater than the layer color separation value, the most suitable z-layer is set as a z-layer having best focus, and whereby if the layer focus comparator value is less than the layer color separation value, the most suitable z-layer is set as a z-layer having best color separation.

38. A computer-implemented method for determining the most suitable z-layer in a given z-stack, comprising computing focus metrics and color separation metrics for each z-layer within a z-stack of images, each z-layer within the z-stack of images corresponding to an image of a tissue sample, and evaluating the focus metrics and color separation metrics to determine a most suitable z-layer within the z-stack.

39. The computer-implemented method of embodiment 38, wherein the focus metrics comprise a focus quality score for each z-layer, and wherein the color separation metrics comprise a color separation quality score for each z-layer.

40. The computer-implemented method of embodiment 39, wherein the focus quality score for each z-layer and the color separation quality score for each z-layer are independently computed within empirically determined color spaces, optimized for signals of an in situ hybridization assay applied to the tissue sample.

41. The computer-implemented method of embodiment 40, wherein the evaluation of the focus metrics and color separation metrics comprises computing an absolute value metric and determining whether the absolute value metric is greater than, equal to, or less than a predetermined threshold value.

42. The computer-implemented method of embodiment 41, wherein the absolute value metric is an absolute value of the difference between the z-layer having best focus and the z-layer having best color separation.

43. The computer-implemented method of embodiment 42, wherein the z-layer having best focus and the z-layer having best color separation are each independently computed by median filtering the focus quality scores and color separation quality scores, respectively, and then identifying a maximum value for the median filtered focus quality scores and a maximum value for the median filtered color separation quality scores.

44. The computer-implemented method of embodiment 43, wherein if the absolute metric is determined to be less than or equal to the predetermined threshold value, instructions are provided to set the most suitable z-layer as a compromise layer metric, wherein the compromise layer metric is an average value of the z-layer having best focus and the z-layer having best color separation.

45. The computer-implemented method of embodiment 43, wherein if the absolute metric is determined to be greater than the predetermined threshold value, instructions are provided to evaluate whether the most suitable z-layer should be guided by focus features or color separation features.

46. The computer method of embodiment 45 wherein the evaluation of whether the most suitable z-layer should be guided by focus features or color separation features is determined by comparing a layer focus comparator value to a layer color separation comparator value, whereby if the layer focus comparator value is greater than the layer color separation value, the most suitable z-layer is set as a z-layer having best focus, and whereby if the layer focus comparator value is less than the layer color separation value, the most suitable z-layer is set as a z-layer having best color separation.

47. A computer-implemented method for the automated evaluation of image tiles derived from a whole slide scan comprising: (a) computing a plurality of focus features and a plurality of color separation features for each individual image tile; (b) deriving a focus quality score from the plurality of focus features and a color separation quality score from the plurality of color separation features; and (c) identifying digital image tiles more suitable for downstream processing based on the focus quality score and the color separation quality score.

48. The computer-implemented method of embodiment 47, wherein the plurality of focus features are selected from (i) a mean/median of the 0th DoG layer for all dot pixels in the image tile; (ii) a mean/median of the 0th DoG layer for all black dot pixels in the image tile; (iii) a mean/median of the max DoG values of the 0th layer for all dot blobs in the image tile; and (iv) a mean of the top DoG values for the 0th layer for all dot blobs in the image tile.

49. The computer-implemented method of embodiment 47, wherein the plurality of color separation features are selected from (i) Amax, (ii) Asigmax; (iii) a maximum in an unmixed black channel; (iv) a gradient value for at least one channel selected from the group consisting of a luminance channel, an unmixed red channel, an A channel, an Asig channel, and a green channel; (v) DoG values in at least one of a channel selected from the group consisting of a green channel, an A channel, and an optical density domain absorbance channel; and (vi) color domain features based on modeling color information in terms of ellipses.

50. The computer-implemented method of embodiment 47, further comprising generating a heat map.

51. The computer-implemented method of embodiment 47, further comprising generating an overlay, where the overlay indicates digital image tiles more suitable for downstream processing.

52. The computer-implemented method of embodiment 47, wherein the focus quality scores and color separation quality score are computed only for those tiles having at least one dot corresponding to a first in situ hybridization signal and at least one dot corresponding to a second in situ hybridization signal.

53. A computer system for the automated evaluation of image tiles derived from a whole slide scan comprising one or more processors and at least one memory, the at least one memory storing non-transitory computer-readable instructions for execution by the one or more processors to cause the one or more processors to: (a) compute a plurality of focus features and a plurality of color separation features for each individual image tile; (b) derive a focus quality score from the plurality of focus features and a color separation quality score from the plurality of color separation features; and (c) identify digital image tiles more suitable for downstream processing based on the focus quality score and the color separation quality score.

54. The computer system of embodiment 53, wherein the plurality of focus features are selected from (i) a mean/median of the 0th DoG layer for all dot pixels in the image tile; (ii) a mean/median of the 0th DoG layer for all black dot pixels in the image tile; (iii) a mean/median of the max DoG values of the 0th layer for all dot blobs in the image tile; and (iv) a mean of the top DoG values for the 0th layer for all dot blobs in the image tile.

55. The computer system of embodiment 53, wherein the plurality of color separation features are selected from (i) Amax, (ii) Asigmax; (iii) a maximum in an unmixed black channel; (iv) a gradient value for at least one channel selected from the group consisting of a luminance channel, an unmixed red channel, an A channel, an Asig channel, and a green channel; (v) DoG values in at least one of a channel selected from the group consisting of a green channel, an A channel, and an optical density domain absorbance channel; and (vi) color domain features based on modeling color information in terms of ellipses.

56. The computer system of embodiment 53, wherein instructions are provided to compute a heat map.

57. The computer system of embodiment 53, wherein instructions are provided to generate an overlay, where the overlay indicates digital image tiles more suitable for downstream processing.

58. The computer system of embodiment 53, wherein the focus quality scores and color separation quality score are computed only for those tiles having at least one dot corresponding to a first in situ hybridization signal and at least one dot corresponding to a second in situ hybridization signal.

59. A computer device configured to analyze images captured from tissue samples comprising one or more processors and at least one memory, the at least one memory storing non-transitory computer-readable instructions for execution by the one or more processors to cause the one or more processors to (i) receive a series of images as input, each image corresponding to a z-layer in a z-stack; (ii) run a focus assessment module to compute a number of metrics derived from focus features and color separation features within the images; and (iii) output a most suitable z-layer in a z-stack of images based on the computed metrics.

60. The computer device of embodiment 53, wherein a quality assessment module is run and an identification of tiles within the input image that are more suitable for downstream processing are provided.

61. A computer system for determining a z-layer that, compared to other z-layers in a given z-stack, comprise features that are well focused and have clearly discernible color features such that differently colored features may be recognized from each other, comprising one or more processors and at least one memory, the at least one memory storing non-transitory computer-readable instructions for execution by the one or more processors to cause the one or more processors to execute instructions to: retrieve a series of images from a z-stack of images, each image corresponding to a different z-layer in the z-stack, and wherein the images are captured from a portion of a tissue specimen pre-treated with two in situ hybridization probes; compute focus metrics and color separation metrics for each z-layer in the z-stack, wherein the focus metrics are derived from focus features of stained regions within the images and wherein the color separation metrics are derived from color separation features of stained regions within the images; and determine the z-layer that, compared to other z-layers in the given z-stack comprises features that are well focused and have clearly discernible color features, based on evaluation of the focus metrics and color separation metrics.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

Although the disclosure herein has been described with reference to particular embodiments, it is to be understood that these embodiments are merely illustrative of the principles and applications of the present disclosure. It is therefore understood that numerous modifications may be made to the illustrative embodiments and that other arrangements may be devised without departing from the spirit and scope of the present disclosure as defined by the appended claims.

The invention claimed is:

1. A computer system for determining the most suitable z-layer in a z-stack of digital images, the z-stack of digital images depicting different layers of a single sample, comprising one or more processors and one or more memories, the one or more memories storing non-transitory computer-readable instructions for execution by the one or more processors to cause the one or more processors to: (a) compute (i) one or more focus metrics for each z-layer within the z-stack of digital images, and (ii) one or more color separation metrics for each z-layer within the z-stack of digital images; and (b) evaluate the computed one or more focus metrics and/or the computed one or more color separation metrics to determine a most suitable z-layer within the z-stack, wherein the computed one or more focus metrics comprise a focus quality score for each z-layer, wherein the focus quality score is derived from one or more focus features in an image tile derived from the z-stack of digital images, and wherein the one or more focus features are selected from the group consisting of: (i) a mean/median of the $0^{th}$ Difference of Gaussian ("DoG") layer for all dot pixels in the image tile; (ii) a mean/median of the $0^{th}$ DoG layer for all black dot pixels in the image tile; (iii) a mean/median of the max DoG values of the $0^{th}$ layer for all dot blobs in the image tile; and (iv) a mean of the top DoG values for the $0^{th}$ layer for all dot blobs in the image tile.

2. The system of claim 1, wherein the computed one or more color separation metrics comprise a color separation quality score for each z-layer.

3. The system of claim 2, wherein the color separation quality score is derived from one or more color separation features.

4. The system of claim 3, wherein the one or more color separation features are selected from the group consisting of: (i) $A_{max}$, (ii) $A_{sigmax}$; (iii) a maximum in an unmixed black channel; (iv) a gradient value for at least one channel selected from the group consisting of a luminance channel, an unmixed red channel, an A channel, an $A_{sig}$ channel, and a green channel; (v) DoG values in at least one of a channel selected from the group consisting of a green channel, an A channel, and an optical density domain absorbance channel; and (vi) color domain features based on modeling color information in terms of ellipses.

5. The system of claim 1, wherein the computed one or more focus metrics or the computed one or more color separation metrics for each z-layer are computed within an empirically determined color space optimized for signals of an in situ hybridization assay applied to the sample, wherein the sample is a tissue sample.

6. The system of claim 1, further comprising identifying the z-layer having either a best focus and/or a best color separation.

7. A non-transitory computer-readable medium storing computer-executable instructions, which, when executed by one or more processors, cause the one or more processors to: (i) compute one or more focus metrics and one or more color separation metrics for each z-layer within a z-stack of images, each z-layer within the z-stack of images corresponding to an image of a biological sample, and (ii) evaluate the focus metrics or color separation metrics to determine a most suitable z-layer within the z-stack wherein the computed one or more focus metrics comprise a focus quality score for each z-layer, wherein the focus quality score is derived from one or more focus features in an image tile derived from the z-stack of digital images, and wherein the one or more focus features are selected from the group consisting of: (i) a mean/median of the $0^{th}$ Difference of Gaussian ("DoG") layer for all dot pixels in the image tile; (ii) a mean/median of the 0th DoG layer for all black dot pixels in the image tile; (iii) a mean/median of the max DoG values of the $0^{th}$ layer for all dot blobs in the image tile; and (iv) a mean of the top DoG values for the $0^{th}$ layer for all dot blobs in the image tile.

8. The non-transitory computer-readable medium of claim 7, wherein the computed one or more color separation metrics comprise a color separation quality score for each z-layer.

9. The non-transitory computer-readable medium of claim 8, wherein the color separation quality score is derived from one or more color separation features.

10. The non-transitory computer-readable medium of claim 9, wherein the one or more color separation features are selected from the group consisting of: (i) $A_{max}$, (ii) $A_{sigmax}$; (iii) a maximum in an unmixed black channel; (iv) a gradient value for at least one channel selected from the group consisting of a luminance channel, an unmixed red channel, an A channel, an $A_{sig}$ channel, and a green channel; (v) DoG values in at least one of a channel selected from the group consisting of a green channel, an A channel, and an optical density domain absorbance channel; and (vi) color domain features based on modeling color information in terms of ellipses.

11. The non-transitory computer-readable medium of claim 7, wherein the instructions further comprise identifying the z-layer having either a best focus and/or a best color separation.

12. The computer system of claim 1, wherein the one or more focus features are derived from a difference of gaussian layer.

13. The non-transitory computer-readable medium of claim 7, wherein the one or more focus features are derived from a difference of gaussian layer.

14. A non-transitory computer-readable medium storing computer-executable instructions, which, when executed by one or more processors, cause the one or more processors to: (i) compute one or more focus metrics or one or more color separation metrics for each z-layer within a z-stack of images, each z-layer within the z-stack of images corresponding to an image of a biological sample, and (ii) evaluate the focus metrics or color separation metrics to determine a most suitable z-layer within the z-stack; wherein the computed one or more focus metrics comprise a focus quality score for each z-layer; wherein the focus quality score for each z-layer is derived from one or more focus features in an image tile derived from the z-stack of digital images; and wherein the one or more focus features are selected from the group consisting of: (i) a mean/median of the $0^{th}$ DoG layer for all dot pixels in the image tile; (ii) a mean/median of the $0^{th}$ DoG layer for all black dot pixels in the image tile; (iii) a mean/median of the max DoG values of the $0^{th}$ layer for all dot blobs in the image tile; and (iv) a mean of the top DoG values for the $0^{th}$ layer for all dot blobs in the image tile.

\* \* \* \* \*